(12) United States Patent
Jung

(10) Patent No.: US 11,960,063 B2
(45) Date of Patent: Apr. 16, 2024

(54) LENS MODULE

(71) Applicant: Samsung Electro-Mechanics Co., Ltd., Suwon-si (KR)

(72) Inventor: Jin Hwa Jung, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 177 days.

(21) Appl. No.: 17/325,406

(22) Filed: May 20, 2021

(65) Prior Publication Data

US 2021/0271057 A1    Sep. 2, 2021

Related U.S. Application Data

(63) Continuation of application No. 16/566,113, filed on Sep. 10, 2019, now Pat. No. 11,042,010, which is a continuation of application No. 14/922,781, filed on Oct. 26, 2015, now Pat. No. 10,451,841.

(30) Foreign Application Priority Data

Nov. 18, 2014    (KR) .......................... 10-2014-0161134

(51) Int. Cl.
  *G02B 13/00*  (2006.01)
  *G02B 9/62*   (2006.01)
  *G02B 13/18*  (2006.01)

(52) U.S. Cl.
  CPC ........... *G02B 13/0045* (2013.01); *G02B 9/62* (2013.01); *G02B 13/18* (2013.01)

(58) Field of Classification Search
  CPC ...... G02B 13/0045; G02B 9/62; G02B 13/18; G02B 13/00; G02B 13/004; G02B 9/60; G02B 9/64; G02B 13/06; G02B 3/04; G02B 3/02; G02B 2003/0093
  USPC ....... 359/713, 752, 756, 728, 739, 761, 682, 359/658
  See application file for complete search history.

(56) References Cited

U.S. PATENT DOCUMENTS

| | | | |
|---|---|---|---|
| 5,257,135 A | 10/1993 | Kohno et al. |
| 8,953,261 B2 | 2/2015 | Tsai |
| 9,201,216 B2 | 12/2015 | Huang et al. |
| 9,678,311 B2 | 6/2017 | Jung |
| 9,804,364 B2 | 10/2017 | Sekine et al. |
| 9,952,406 B2 | 4/2018 | Jung |
| 10,451,841 B2 | 10/2019 | Jung |

(Continued)

FOREIGN PATENT DOCUMENTS

| | | |
|---|---|---|
| CN | 202975455 U | 6/2013 |
| CN | 203069867 U | 7/2013 |

(Continued)

OTHER PUBLICATIONS

Gross, Handbook of Optical Systems, 2007, Wiley, vol. 3 (Year: 2007).*

(Continued)

*Primary Examiner* — Jie Lei
(74) *Attorney, Agent, or Firm* — NSIP Law

(57) ABSTRACT

A lens module includes a first lens, an object-side surface thereof being convex; a second lens, both surfaces thereof being convex; a third lens, both surfaces thereof being concave; a fourth lens having positive refractive power, both surfaces thereof being convex; a fifth lens, an object-side surface thereof being concave; and a sixth lens, an object-side surface thereof being convex. The first to sixth lenses are sequentially disposed in numerical order from the first lens to the sixth lens from an object side of the lens module toward an image side of the lens module.

17 Claims, 30 Drawing Sheets

(56) References Cited

U.S. PATENT DOCUMENTS

| | | |
|---|---|---|
| 10,901,182 B2 | 1/2021 | Park |
| 11,042,010 B2* | 6/2021 | Jung .................. G02B 9/62 |
| 2012/0206822 A1 | 8/2012 | Hsieh et al. |
| 2012/0314304 A1 | 12/2012 | Huang |
| 2013/0329305 A1 | 12/2013 | Kunugise |
| 2013/0342918 A1 | 12/2013 | Kubota et al. |
| 2014/0078603 A1 | 3/2014 | You |
| 2015/0098135 A1* | 4/2015 | Chung ............... G02B 13/18 359/713 |
| 2015/0124333 A1 | 5/2015 | Noda et al. |
| 2015/0212296 A1* | 7/2015 | Huang ................. G02B 3/04 359/713 |
| 2015/0268447 A1 | 9/2015 | Huang |
| 2016/0282588 A1 | 9/2016 | Sekine et al. |

FOREIGN PATENT DOCUMENTS

| | | |
|---|---|---|
| CN | 103403602 A | 11/2013 |
| KR | 10-2014-0035810 A | 3/2014 |
| TW | 201418764 A | 5/2014 |
| WO | WO 2014/013677 A1 | 1/2014 |
| WO | WO 2015/060166 A1 | 4/2015 |

OTHER PUBLICATIONS

Korean Office Action dated Apr. 1, 2016, in counterpart Korean Application No. 10-2014-0161134 (12 pages in English and 9 pages in Korean).

Chinese Office Action dated Apr. 28, 2018, in counterpart Chinese Patent Application No. 201510750797.1 (6 pages in English and 4 pages in Chinese).

Chinese Office Action dated Dec. 3, 2018, in counterpart Chinese Patent Application No. 201510750797.1 (7 pages in English and 6 pages in Chinese).

Chinese Office Action dated Nov. 27, 2020, in counterpart Chinese Patent Application No. 201910409313.5 (7 pages in English and 8 pages in Chinese).

U.S. Appl. No. 16/566,113, filed Sep. 10, 2019, Jin Hwa Jung, Samsung Electro-Mechanics Co., Ltd.

* cited by examiner

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 3692.963 | 0.398 | 1.544 | 56.1 | FIRST LENS |
| 2 | 6.466 | 0.513 | | | |
| ST | Infinity | 0.000 | | | STOP |
| 3 | 1.890 | 0.673 | 1.5441 | 56.1 | SECOND LENS |
| 4 | -2.148 | 0.100 | | | |
| 5 | -9.506 | 0.200 | 1.6167 | 25.6 | THIRD LENS |
| 6 | 2.440 | 0.100 | | | |
| 7 | 8.473 | 0.469 | 1.5441 | 56.1 | FOURTH LENS |
| 8 | -1.349 | 0.349 | | | |
| 9 | -1.831 | 0.250 | 1.6167 | 25.6 | FIFTH LENS |
| 10 | -2.224 | 0.396 | | | |
| 11 | 2.868 | 0.300 | 1.5441 | 56.1 | SIXTH LENS |
| 12 | 0.859 | 0.202 | | | |
| 13 | Infinity | 0.110 | | | FILTER |
| 14 | Infinity | 0.240 | | | |
| IMAGE PLANE | Infinity | 0.000 | | | |

FIG. 4

| FIRST EXAMPLE | 1 | 2 | 3 | 4 | 5 | 6 | 7 | 8 | 11 | 12 |
|---|---|---|---|---|---|---|---|---|---|---|
| RADIUS OF CURVATURE | 3692.963 | 6.466 | 1.890 | -2.148 | -9.506 | 2.440 | 8.473 | -1.349 | 2.868 | 0.859 |
| CONIC (K) | 0.000 | 0.000 | 4.787 | -6.267 | 0.000 | -11.286 | 0.000 | -1.130 | 0.000 | -4.575 |
| 4TH ORDER (A) | 0.128 | 0.249 | -0.093 | -0.351 | -0.504 | -0.182 | -0.023 | -0.019 | -0.839 | -0.283 |
| 6TH ORDER (B) | -0.037 | -0.030 | -0.005 | 0.402 | 0.449 | 0.105 | -0.196 | -0.104 | 0.552 | 0.222 |
| 8TH ORDER (C) | 0.017 | 0.092 | -1.521 | -2.498 | -0.363 | 0.400 | -0.259 | 0.270 | -0.244 | -0.108 |
| 10TH ORDER (D) | -0.004 | 0.000 | 2.550 | 6.164 | 1.927 | -0.402 | 0.994 | -0.744 | -0.008 | 0.030 |
| 12TH ORDER (E) | 0.000 | 0.000 | -0.693 | -5.600 | -5.420 | 0.296 | -1.432 | 0.580 | 0.031 | -0.004 |
| 14TH ORDER (F) | 0.000 | 0.000 | -6.433 | -1.953 | 5.186 | 0.000 | 1.362 | -0.030 | 0.000 | 0.000 |

FIG. 5

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 38.608 | 0.396 | 1.5441 | 56.1 | FIRST LENS |
| 2 | 5.397 | 0.469 | | | |
| ST | Infinity | 0.000 | | | STOP |
| 3 | 1.865 | 0.677 | 1.5441 | 56.1 | SECOND LENS |
| 4 | -2.261 | 0.100 | | | |
| 5 | -7.666 | 0.200 | 1.6167 | 25.6 | THIRD LENS |
| 6 | 2.659 | 0.100 | | | |
| 7 | 12.362 | 0.448 | 1.5441 | 56.1 | FOURTH LENS |
| 8 | -1.332 | 0.380 | | | |
| 9 | -2.023 | 0.250 | 1.6167 | 25.6 | FIFTH LENS |
| 10 | -2.387 | 0.448 | | | |
| 11 | 4.600 | 0.300 | 1.5441 | 56.1 | SIXTH LENS |
| 12 | 0.960 | 0.183 | | | |
| 13 | Infinity | 0.110 | | | FILTER |
| 14 | Infinity | 0.240 | | | |
| IMAGE PLANE | Infinity | 0.000 | | | |

FIG. 9

| SECOND EXAMPLE | 1 | 2 | 3 | 4 | 5 | 6 | 7 | 8 | 11 | 12 |
|---|---|---|---|---|---|---|---|---|---|---|
| RADIUS OF CURVATURE | 38.608 | 5.397 | 1.865 | -2.261 | -7.666 | 2.659 | 12.362 | -1.332 | 4.600 | 0.960 |
| CONIC (K) | 0.000 | 0.000 | 5.287 | -7.148 | 0.000 | -12.659 | 0.000 | -1.157 | 0.000 | -5.279 |
| 4TH ORDER (A) | 0.129 | 0.263 | -0.092 | -0.346 | -0.483 | -0.177 | -0.037 | -0.018 | -0.741 | -0.248 |
| 6TH ORDER (B) | -0.036 | -0.022 | 0.002 | 0.402 | 0.444 | 0.117 | -0.195 | -0.116 | 0.466 | 0.183 |
| 8TH ORDER (C) | 0.016 | 0.101 | -1.574 | -2.545 | -0.404 | 0.391 | -0.281 | 0.266 | -0.150 | -0.084 |
| 10TH ORDER (D) | -0.004 | 0.000 | 2.454 | 6.218 | 1.876 | -0.442 | 0.965 | -0.746 | -0.056 | 0.022 |
| 12TH ORDER (E) | 0.000 | 0.000 | -0.693 | -5.600 | -5.420 | 0.269 | -1.452 | 0.571 | 0.039 | -0.003 |
| 14TH ORDER (F) | 0.000 | 0.000 | -6.433 | -1.953 | 5.186 | 0.000 | 1.306 | -0.046 | 0.000 | 0.000 |

FIG. 10

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 20242.260 | 0.346 | 1.5441 | 56.1 | FIRST LENS |
| 2 | 6.041 | 0.465 | | | |
| ST | Infinity | 0.000 | | | STOP |
| 3 | 1.859 | 0.723 | 1.5441 | 56.1 | SECOND LENS |
| 4 | -1.950 | 0.100 | | | |
| 5 | -6.847 | 0.200 | 1.6167 | 25.6 | THIRD LENS |
| 6 | 2.342 | 0.100 | | | |
| 7 | 8.815 | 0.416 | 1.5441 | 56.1 | FOURTH LENS |
| 8 | -1.425 | 0.377 | | | |
| 9 | -2.190 | 0.250 | 1.6167 | 25.6 | FIFTH LENS |
| 10 | -2.294 | 0.439 | | | |
| 11 | 7.191 | 0.300 | 1.5441 | 56.1 | SIXTH LENS |
| 12 | 0.973 | 0.168 | | | |
| 13 | Infinity | 0.110 | | | FILTER |
| 14 | Infinity | 0.240 | | | |
| IMAGE PLANE | Infinity | 0.000 | | | |

FIG. 14

| THIRD EXAMPLE | 1 | 2 | 3 | 4 | 5 | 6 | 7 | 8 | 11 | 12 |
|---|---|---|---|---|---|---|---|---|---|---|
| RADIUS OF CURVATURE | 20242.260 | 6.041 | 1.859 | -1.950 | -6.847 | 2.342 | 8.815 | -1.425 | 7.191 | 0.973 |
| CONIC (K) | 0.000 | 0.000 | 5.492 | -8.236 | 0.000 | -12.505 | 0.000 | -1.118 | 0.000 | -6.141 |
| 4TH ORDER (A) | 0.127 | 0.243 | -0.106 | -0.345 | -0.466 | -0.174 | -0.036 | -0.021 | -0.824 | -0.246 |
| 6TH ORDER (B) | -0.041 | -0.027 | -0.024 | 0.396 | 0.420 | 0.109 | -0.190 | -0.122 | 0.665 | 0.193 |
| 8TH ORDER (C) | 0.016 | 0.072 | -1.478 | -2.460 | -0.558 | 0.344 | -0.273 | 0.254 | -0.430 | -0.097 |
| 10TH ORDER (D) | -0.004 | 0.000 | 2.311 | 6.114 | 2.019 | -0.514 | 0.971 | -0.734 | 0.133 | 0.028 |
| 12TH ORDER (E) | 0.000 | 0.000 | -0.693 | -5.600 | -5.420 | 0.349 | -1.461 | 0.586 | -0.007 | -0.004 |
| 14TH ORDER (F) | 0.000 | 0.000 | -6.433 | -1.953 | 5.186 | 0.000 | 1.136 | -0.075 | 0.000 | 0.000 |

FIG. 15

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 3141.001 | 0.267 | 1.5441 | 56.1 | FIRST LENS |
| 2 | 22.921 | 0.812 | | | |
| ST | Infinity | 0.000 | | | STOP |
| 3 | 1.884 | 0.497 | 1.5441 | 56.1 | SECOND LENS |
| 4 | -2.616 | 0.100 | | | |
| 5 | -6.941 | 0.200 | 1.6167 | 25.6 | THIRD LENS |
| 6 | 2.544 | 0.100 | | | |
| 7 | 9.556 | 0.456 | 1.5441 | 56.1 | FOURTH LENS |
| 8 | -1.306 | 0.184 | | | |
| 9 | -3.140 | 0.250 | 1.6167 | 25.6 | FIFTH LENS |
| 10 | -3.252 | 0.421 | | | |
| 11 | 2.236 | 0.300 | 1.5441 | 56.1 | SIXTH LENS |
| 12 | 0.769 | 0.217 | | | |
| 13 | Infinity | 0.110 | | | FILTER |
| 14 | Infinity | 0.270 | | | |
| IMAGE PLANE | Infinity | 0.000 | | | |

FIG. 19

| FOURTH EXAMPLE | 1 | 2 | 3 | 4 | 5 | 6 | 7 | 8 | 11 | 12 |
|---|---|---|---|---|---|---|---|---|---|---|
| RADIUS OF CURVATURE | 3141.001 | 22.921 | 1.884 | -2.616 | -6.941 | 2.544 | 9.556 | -1.306 | 2.236 | 0.769 |
| CONIC (K) | 0 | 0 | 4.209 | -9.145 | 0 | -12.59 | 0 | -1.245 | 0 | -4.17 |
| 4TH ORDER (A) | 0.14 | 0.205 | -0.144 | -0.341 | -0.416 | -0.14 | -0.036 | -0.015 | -0.978 | -0.329 |
| 6TH ORDER (B) | -0.041 | -0.049 | -0.116 | 0.325 | 0.404 | 0.162 | -0.127 | -0.091 | 0.817 | 0.291 |
| 8TH ORDER (C) | 0.033 | 0.08 | -1.008 | -3.05 | -0.575 | 0.326 | -0.241 | 0.289 | -0.614 | -0.165 |
| 10TH ORDER (D) | -0.006 | 0 | 0.548 | 6.602 | 2.529 | -0.637 | 0.942 | -0.674 | 0.286 | 0.054 |
| 12TH ORDER (E) | 0 | 0 | -0.693 | -5.6 | -5.42 | 0.454 | -1.495 | 0.602 | -0.062 | -0.01 |
| 14TH ORDER (F) | 0 | 0 | -6.433 | -1.953 | 5.186 | 0 | 0.858 | -0.172 | 0 | 0.001 |

FIG. 20

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 277.096 | 0.250 | 1.5441 | 56.1 | FIRST LENS |
| 2 | 23.943 | 0.770 | | | |
| ST | Infinity | 0.000 | | | STOP |
| 3 | 1.898 | 0.484 | 1.5441 | 56.1 | SECOND LENS |
| 4 | -2.869 | 0.100 | | | |
| 5 | -7.590 | 0.200 | 1.6167 | 25.6 | THIRD LENS |
| 6 | 2.510 | 0.100 | | | |
| 7 | 7.526 | 0.436 | 1.5441 | 56.1 | FOURTH LENS |
| 8 | -1.416 | 0.128 | | | |
| 9 | -4.800 | 0.251 | 1.6167 | 25.6 | FIFTH LENS |
| 10 | -4.935 | 0.450 | | | |
| 11 | 1.823 | 0.300 | 1.5441 | 56.1 | SIXTH LENS |
| 12 | 0.744 | 0.201 | | | |
| 13 | Infinity | 0.110 | | | FILTER |
| 14 | Infinity | 0.370 | | | |
| IMAGE PLANE | Infinity | 0.000 | | | |

FIG. 24

| FIFTH EXAMPLE | 1 | 2 | 3 | 4 | 5 | 6 | 7 | 8 | 11 | 12 |
|---|---|---|---|---|---|---|---|---|---|---|
| RADIUS OF CURVATURE | 277.096 | 23.943 | 1.898 | -2.869 | -7.590 | 2.510 | 7.526 | -1.416 | 1.823 | 0.744 |
| CONIC (K) | 0.000 | 0.000 | 4.089 | -12.000 | 0.000 | -14.347 | 0.000 | -0.967 | -0.345 | -3.909 |
| 4TH ORDER (A) | 0.146 | 0.218 | -0.125 | -0.337 | -0.395 | -0.133 | -0.065 | -0.032 | -1.058 | -0.392 |
| 6TH ORDER (B) | -0.046 | -0.066 | -0.176 | 0.320 | 0.405 | 0.174 | -0.086 | -0.063 | 0.833 | 0.367 |
| 8TH ORDER (C) | 0.037 | 0.092 | -0.883 | -3.045 | -0.627 | 0.305 | -0.252 | 0.284 | -0.594 | -0.226 |
| 10TH ORDER (D) | -0.007 | 0.000 | 0.795 | 6.793 | 2.742 | -0.679 | 0.909 | -0.697 | 0.243 | 0.081 |
| 12TH ORDER (E) | 0.000 | 0.000 | -0.693 | -5.600 | -5.420 | 0.595 | -1.462 | 0.613 | -0.034 | -0.016 |
| 14TH ORDER (F) | 0.000 | 0.000 | -6.433 | -1.953 | 5.186 | 0.000 | 1.063 | -0.062 | 0.000 | 0.001 |

FIG. 25

| SURFACE NO. | RADIUS OF CURVATURE | THICKNESS/ DISTANCE | REFRACTIVE INDEX | ABBE NUMBER | REMARKS |
|---|---|---|---|---|---|
| OBJECT | Infinity | Infinity | | | |
| 1 | 49.603 | 0.250 | 1.5441 | 56.1 | FIRST LENS |
| 2 | 10.231 | 0.632 | | | |
| ST | Infinity | 0.000 | | | STOP |
| 3 | 1.890 | 0.439 | 1.5441 | 56.1 | SECOND LENS |
| 4 | -3.557 | 0.100 | | | |
| 5 | -18.435 | 0.200 | 1.6167 | 25.6 | THIRD LENS |
| 6 | 2.428 | 0.100 | | | |
| 7 | 6.988 | 0.454 | 1.5441 | 56.1 | FOURTH LENS |
| 8 | -1.336 | 0.215 | | | |
| 9 | -2.773 | 0.250 | 1.6167 | 25.6 | FIFTH LENS |
| 10 | -3.771 | 0.621 | | | |
| 11 | 3.258 | 0.300 | 1.5441 | 56.1 | SIXTH LENS |
| 12 | 0.910 | 0.189 | | | |
| 13 | Infinity | 0.110 | | | FILTER |
| 14 | Infinity | 0.240 | | | |
| IMAGE PLANE | Infinity | 0.000 | | | |

| SIXTH EXAMPLE | 1 | 2 | 3 | 4 | 5 | 6 | 7 | 8 | 9 | 11 | 12 |
|---|---|---|---|---|---|---|---|---|---|---|---|
| RADIUS OF CURVATURE | 49.603 | 10.231 | 1.89 | -3.557 | -18.435 | 2.428 | 6.988 | -1.336 | -2.773 | 3.258 | 0.91 |
| CONIC (K) | 0 | 0 | 4.036 | -28.566 | 0 | -13.857 | 0 | -1.316 | 2.047 | 0.145 | -5.082 |
| 4TH ORDER (A) | 0.14 | 0.224 | -0.102 | -0.309 | -0.386 | -0.125 | -0.056 | -0.016 | 0.005 | -0.805 | -0.262 |
| 6TH ORDER (B) | -0.039 | -0.063 | -0.247 | 0.337 | 0.839 | 0.099 | -0.043 | -0.092 | 0.001 | 0.605 | 0.204 |
| 8TH ORDER (C) | 0.034 | 0.115 | -0.786 | -3.086 | -3.392 | 1.218 | -0.299 | 0.286 | -0.083 | -0.379 | -0.103 |
| 10TH ORDER (D) | -0.006 | 0 | 1.192 | 6.911 | 9.584 | -7.036 | 0.79 | -0.683 | 0.13 | 0.149 | 0.031 |
| 12TH ORDER (E) | 0 | 0 | -0.693 | -5.6 | -10.87 | 19.606 | -1.51 | 0.58 | -0.083 | -0.038 | -0.005 |
| 14TH ORDER (F) | 0 | 0 | -6.433 | -1.953 | 3.754 | -25.35 | 1.347 | -0.206 | 0 | 0 | 0 |
| 16TH ORDER (G) | 0 | 0 | 0 | 0 | 0 | 12.467 | 0 | 0 | 0 | 0 | 0 |

LENS MODULE

CROSS-REFERENCE TO RELATED APPLICATIONS

This application is a continuation of application Ser. No. 16/566,113 filed on Sep. 10, 2019, now U.S. Pat. No. 11,042,010 issued on Jun. 22, 2021, which is a continuation of application Ser. No. 14/922,781 filed on Oct. 26, 2015, now U.S. Pat. No. 10,451,841 issued on Oct. 22, 2019, and claims the benefit under 35 USC 119(a) of Korean Patent Application No. 10-2014-0161134 filed on Nov. 18, 2014, in the Korean Intellectual Property Office, the entire disclosures of which are incorporated herein by reference for all purposes.

BACKGROUND

1. Field

This application relates to a lens module having an optical system including six lenses.

2. Description of Related Art

A lens module in a camera module in a mobile communications terminal includes a plurality of lenses. For example, the lens module may include six lenses in order to configure a high-resolution optical system However, when a high-resolution optical system is configured using the plurality of lenses as described above, a length (the distance from an object-side surface of a first lens to an image plane) of the optical system may be increased. In this case, it is difficult to mount the lens module in a thin mobile communications terminal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens module includes a first lens, an object-side surface thereof being convex; a second lens, both surfaces thereof being convex; a third lens, both surfaces thereof being concave; a fourth lens having positive refractive power, both surfaces thereof being convex; a fifth lens, an object-side surface thereof being concave; and a sixth lens, an object-side surface thereof being convex, the sixth lens having one or more inflection points on an image-side surface thereof; wherein the first to sixth lenses are sequentially disposed in numerical order from the first lens to the sixth lens from an object side of the lens module toward an image side of the lens module.

An image-side surface of the first lens may be concave.
An image-side surface of the fifth lens may be convex.
The image-side surface of the sixth lens may be concave.

In the lens module, $f1/f < -4.0$ may be satisfied, where f is an overall focal length of an optical system including the first to sixth lenses, and f1 is a focal length of the first lens.

In the lens module, $f5/f < -7.0$ may be satisfied, where f is an overall focal length of an optical system including the first to sixth lenses, and f5 is a focal length of the fifth lens.

In the lens module, $6.0 < TTL/BFL$ may be satisfied, where TTL is a distance from the object-side surface of the first lens to an image plane of the lens module, and BFL is a distance from the image-side surface of the sixth lens to the image plane.

In the lens module, $(r9+r10)/(r9-r10) < -6.0$ may be satisfied, where r9 is a radius of curvature of the object-side surface of the fifth lens, and r10 is a radius of curvature of an image-side surface of the fifth lens.

In the lens module, $70 < r1/T12$ may be satisfied, where r1 is a radius of curvature of the object-side surface of the first lens, and T12 is a distance from an image-side surface of the first lens to an object-side surface of the second lens.

In the lens module, $0.2 < T45/T56$ may be satisfied, where T45 is a distance from an image-side surface of the fourth lens to the object-side surface of the fifth lens, and T56 is a distance from an image-side surface of the fifth lens to the object-side surface of the sixth lens.

In another general aspect, a lens module includes a first lens having negative refractive power; a second lens having positive refractive power; a third lens having refractive power; a fourth lens having positive refractive power; a fifth lens having negative refractive power; and a sixth lens having negative refractive power and having one or more inflection points on an image-side surface thereof; wherein the first to sixth lenses are sequentially disposed in numerical order from the first lens to the sixth lens from an object side of the lens module toward an image side of the lens module.

In another general aspect, a lens module includes a first lens having negative refractive power; a second lens having positive refractive power; a third lens having negative refractive power; a fourth lens having positive refractive power; a fifth lens having negative refractive power; and a sixth lens having refractive power and having one or more inflection points on an image-side surface thereof; wherein the first to sixth lenses are sequentially disposed in numerical order from the first lens to the sixth lens from an object side of the lens module toward an image side of the lens module.

The sixth lens may have negative refractive power.

In another general aspect, a lens module includes first to sixth lenses having refractive power sequentially disposed in numerical order from the first lens to the sixth lens starting at an object side of the lens module; wherein each of the first lens, the second lens, the fourth lens, and the fifth lens has positive or negative refractive power; both surfaces of the third lens are concave; a sign of the refractive power of the first lens and a sign of the refractive power of the fifth lens are symmetrical to each other in relation to the third lens; and a sign of the refractive power of the second lens and a sign of the refractive power of the fourth lens are symmetrical to each other in relation to the third lens.

A shape of a center of the first lens on an optical axis of the lens module and a shape of a center of the fifth lens on the optical axis may be symmetrical to each other in relation to the third lens; and a shape of a center of the second lens on the optical axis and a shape of a center of the fourth lens on the optical axis may be symmetrical to each other in relation to the third lens.

The first lens may have a meniscus shape and an object-side surface that is convex.

Both surfaces of the second lens may be convex.

In the lens module, $0.6 < (1/f1+1/f2)/(1/f4+1/f5) < 1.6$ may be satisfied, where f1 is a focal length of the first lens, f2 is a focal length of the second lens, f4 is a focal length of the fourth lens, and f5 is a focal length of the fifth lens.

Other features and aspects will be apparent from the following detailed description, the drawings, and the claims.

BRIEF DESCRIPTION OF DRAWINGS

FIG. 4 is a table representing characteristics of the lenses of the lens module illustrated in FIG. 1.

FIG. 5 is a table representing aspherical surface coefficients of the lenses of the lens module illustrated in FIG. 1.

FIG. 9 is a table representing characteristics of the lenses of the lens module illustrated in FIG. 6.

FIG. 10 is a table representing aspherical surface coefficients of the lenses of the lens module illustrated in FIG. 6.

FIG. 14 is a table representing characteristics of the lenses of the lens module illustrated in FIG. 11.

FIG. 15 is a table representing aspherical surface coefficients of the lenses of the lens module illustrated in FIG. 11.

FIG. 19 is a table representing characteristics of the lenses of the lens module illustrated in FIG. 16.

FIG. 20 is a table representing aspherical surface coefficients of the lenses of the lens module illustrated in FIG. 16.

FIG. 24 is a table representing characteristics of the lenses of the lens module illustrated in FIG. 21.

FIG. 25 is a table representing aspherical surface coefficients of the lenses of the lens module illustrated in FIG. 21.

FIG. 29 is a table representing characteristics of the lenses of the lens module illustrated in FIG. 26.

FIG. 30 is a table representing aspherical surface coefficients of the lenses of the lens module illustrated in FIG. 26.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
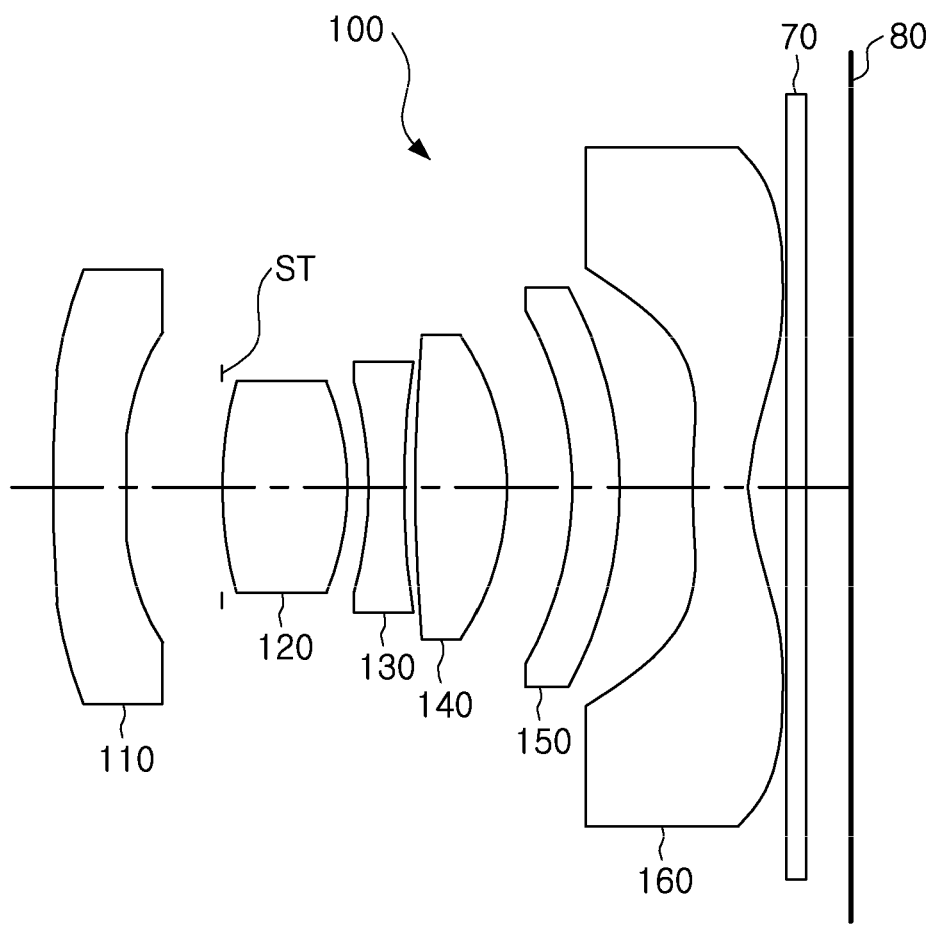
FIG. 1 is a view of a first example of a lens module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In this application, a first lens refers to a lens closest to an object (or a subject), while a sixth lens refers to a lens closest to an image plane (or an image sensor). Further, a first surface of each lens refers to a surface thereof closest to an object (or a subject), and a second surface of each lens refers to a surface thereof closest to an image plane (or an image sensor). Further, all of radii of curvature, thicknesses, OALs (optical axis distances from a first surface of the first lens to the image plane), SLs (distances from a stop to the image plane), IMGHs (image heights), BFLs (back focus lengths) of the lenses, an overall focal length of an optical system, and a focal length of each lens are expressed in millimeters (mm). Further, thicknesses of lenses, gaps between the lenses, OALs, and SLs are distances measured in relation to an optical axis of the lenses. Further, in a description for shapes of the lenses, a statement that one surface of a lens is convex means that an optical axis portion of a corresponding surface is convex, and a statement that one surface of a lens is concave means that an optical axis portion of a corresponding surface is concave. Therefore, although it may be described that one surface of a lens is convex, an edge portion of the lens may be concave. Likewise, although it may be described that one surface of a lens is concave, an edge portion of the lens may be convex.

A lens module includes an optical system including a plurality of lenses. As an example, the optical system of the lens module may include six lenses having refractive power. However, the lens module is not limited thereto. For example, the lens module may include other components that do not have refractive power. As an example, the lens module may include a stop controlling an amount of light. As another example, the lens module may further include an infrared cut-off filter filtering infrared light. As another example, the lens module may further include an image sensor (that is, an imaging device) converting an image of a subject incident thereon through the optical system into electrical signals. As another example, the lens module may further include a gap maintaining member adjusting a gap between lenses.

First to sixth lenses may be formed of materials having a refractive index different from that of air. For example, the first to sixth lenses may be formed of plastic or glass. At least one of the first to sixth lenses may have an aspherical surface shape. As an example, only the sixth lens of the first to sixth lenses may have an aspherical surface shape. As another example, at least one surface of all of the first to sixth lenses may be aspherical. Here, the aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

Here, c is an inverse of a radius of curvature of a corresponding lens, k is a conic constant, and r is a distance from a certain point on an aspherical surface to an optical axis in a direction perpendicular to the optical axis. In addition, constants A to J are respectively 4th order to 20th order aspherical surface coefficients. In addition, Z is a distance between the certain point on the aspherical surface at the distance r and a tangential plane meeting the apex of the aspherical surface of the lens.

The lens module may have a wide field of view (FOV) of 75° or more. Therefore, the lens module may easily photograph a wide background or object.

The optical system of the lens module may satisfy the following Conditional Expression:

$$f1/f < -4.0$$

Here, f is an overall focal length in mm of the optical system including the first to sixth lenses, and f1 is a focal length in mm of the first lens.

The above Conditional Expression is a condition for optimizing a spherical aberration correction effect by the first lens. For example, in a case in which f1/f is out of an upper limit value of the above Conditional Expression, the first lens has high refractive power, and thus the spherical aberration correction effect of the first lens may be insufficient.

The optical system of the lens module may satisfy the following Conditional Expression:

$$f5/f < -7.0$$

Here, f is an overall focal length in mm of the optical system including the first to sixth lenses, and f5 is a focal length in mm of the fifth lens.

The above Conditional Expression is a condition for optimizing an aberration correction effect by the fifth lens. For example, in a case in which f5/f is out of an upper limit value of the above Conditional Expression, the fifth lens has high refractive power, and thus an aberration correction effect may be insufficient and high resolution may not be obtained.

The optical system of the lens module may satisfy the following Conditional Expression:

$$6.0 < TTL/BFL$$

Here, TTL is a distance in mm from an object-side surface of the first lens to an image plane, and BFL is a distance in mm from an image-side surface of the sixth lens to the image plane.

The above Conditional Expression is an optimal condition for making the lens module thin. For example, the lens module satisfying the above Conditional Expression may be advantageous in shortening an overall length of the optical system. In addition, the above Conditional Expression is a condition for extending a field of view of the lens module. For example, the lens module satisfying the above Conditional Expression may be advantageous in providing a field of view of 80° or more.

Meanwhile, the above Conditional Expression may also be optimized in the following numerical range:

$$6.0 < TTL/BFL < 8.6$$

The optical system of the lens module may satisfy the following Conditional Expression:

$$(r9+r10)/(r9-r10) < -6.0$$

Here, r9 is a radius of curvature in mm of an object-side surface of the fifth lens, and r10 is a radius of curvature in mm of an image-side surface of the fifth lens.

The above Conditional Expression is a condition for optimizing an aberration correction effect by the fifth lens. For example, in a case in which (r9+r10)/(r9−r10) is out of an upper limit value of the above Conditional Expression, the fifth lens may have an insufficient aberration correction effect and be disadvantageous in realizing high resolution. Conversely, in a case in which the above Conditional Expression is satisfied, the fifth lens may have an excellent aberration correction effect and be advantageous in realizing high resolution.

The optical system of the lens module may satisfy the following Conditional Expression:

$$70 < r1/T12$$

Here, r1 is a radius of curvature of the object-side surface of the first lens, and T12 is a distance from an image-side surface of the first lens to an object-side surface of the second lens.

The above Conditional Expression is a condition for realizing high resolution of the optical system. For example, in a case in which 70<r1/T12 is out of a lower limit value of the above Conditional Expression, it may be difficult to make the lens module thin and realize high resolution.

The optical system of the lens module may satisfy the following Conditional Expression:

$$0.2 < T45/T56$$

Here, T45 is a distance in mm from an image-side surface of the fourth lens to an object-side surface of the fifth lens, and T56 is a distance in mm from an image-side surface of the fifth lens to an object-side surface of the sixth lens.

The above Conditional Expression is a condition for optimizing an aberration correction effect by an air gap formed between the fourth and fifth lenses and an air gap formed between the fifth and sixth lenses. For example, in a case in which T45/T56 is out of a lower limit value of the above Conditional Expression, the optical system may have an insufficient aberration correction effect and be disadvantageous in making the lens module thin. Conversely, in a case in which the above Conditional Expression is satisfied, the optical system may have an excellent aberration correction effect and be advantageous in making the lens module thin.

Meanwhile, the above Conditional Expression may also be optimized in the following numerical range:

$$0.2 < T45/T56 < 0.9$$

In the optical system of the lens module, the lenses may have positive and/or negative refractive powers that are symmetrical to each other in relation to the third lens of which both surfaces are concave, and shapes of centers thereof on the optical axis may be symmetrical to each other in relation to the third lens. As an example, when refractive power of the first lens is negative and refractive power of the second lens is positive, refractive power of the fourth lens is positive and refractive power of the fifth lens is negative. As another example, when the first lens has a meniscus shape of which an object-side surface is convex and both surfaces of the second lens are convex, both surfaces of the fourth lens are convex and the fifth lens has a meniscus shape of which an image-side surface is convex. Similarly, in the optical system of the lens module, magnitudes of the refractive powers of the lenses may be symmetrical to each other in relation to the third lens of which both surfaces are concave. As an example, the lens module may satisfy the following Conditional Expression:

$$0.6 < (1/f1 + 1/f2)/(1/f4 + 1/f5) < 1.6$$

Here, f1 is the focal length of the first lens, f2 is a focal length of the second lens, f4 is a focal length of the fourth lens, and f5 is the focal length of the fifth lens.

In a case in which a numerical range depending on the above Conditional Expression is satisfied, the optical system may easily correct aberration and chromatic aberration through the first to fifth lenses.

The lens module may be manufactured in the following form.

As an example, the optical system of the lens module may include a first lens of which an object-side surface is convex; a second lens of which both surfaces are convex; a third lens of which both surfaces are concave; a fourth lens having positive refractive power, both surfaces thereof being convex; a fifth lens of which an object-side surface is concave; and a sixth lens of which an object-side surface is convex.

As another example, the optical system of the lens module may include a first lens having negative refractive power; a second lens having positive refractive power; a third lens having refractive power; a fourth lens having positive refractive power; a fifth lens having negative refractive power; and a sixth lens having negative refractive power.

Next, the main components of the lens module will be described.

The first lens may have refractive power. For example, the first lens may have negative refractive power.

The first lens may be convex toward an object side. As an example, a first surface (object-side surface) of the first lens may be convex and a second surface (image-side surface) thereof may be concave.

The first lens may have an aspherical surface. For example, both surfaces of the first lens may be aspherical. The first lens may be formed of a material having high light transmissivity and excellent workability. For example, the first lens may be formed of plastic. However, a material of the first lens is not limited to plastic. For example, the first lens may be formed of glass.

The second lens may have refractive power. For example, the second lens may have positive refractive power.

Both surfaces of the second lens may be convex. As an example, a first surface of the second lens may be convex and a second surface thereof may be convex.

The second lens may have an aspherical surface. For example, both surfaces of the second lens may be aspherical. The second lens may be formed of a material having high light transmissivity and excellent workability. For example, the second lens may be formed of plastic. However, a material of the second lens is not limited to plastic. For example, the second lens may be formed of glass.

The third lens may have refractive power. For example, the third lens may have negative refractive power.

Both surfaces of the third lens may be concave. As an example, a first surface of the third lens may be concave and a second surface thereof may be concave.

The third lens may have an aspherical surface. For example, both surfaces of the third lens may be aspherical. The third lens may be formed of a material having high light transmissivity and excellent workability. For example, the third lens may be formed of plastic. However, a material of the third lens is not limited to plastic. For example, the third lens may be formed of glass.

The third lens may be formed of a material having a high refractive index. For example, the third lens may be formed of a material having a refractive index of 1.60 or more (in this case, the third lens may have an Abbe number of 30 or less). The third lens formed of this material may easily refract light even when having a small curvature shape. Therefore, the third lens formed of this material may be easily manufactured and be advantageous in lowering a defect rate depending on a manufacturing tolerance. In addition, the third lens formed of this material may decrease a distance between lenses, and thus it may be advantageous in miniaturizing the lens module.

The fourth lens may have refractive power. For example, the fourth lens may have positive refractive power.

Both surfaces of the fourth lens may be convex. For example, a first surface of the fourth lens may be convex and a second surface thereof may be convex.

The fourth lens may have an aspherical surface. For example, both surfaces of the fourth lens may be aspherical. The fourth lens may be formed of a material having high light transmissivity and excellent workability. For example, the fourth lens may be formed of plastic. However, a material of the fourth lens is not limited to plastic. For example, the fourth lens may be formed of glass.

The fifth lens may have refractive power. For example, the fifth lens may have negative refractive power.

The fifth lens may be convex toward an image side. For example, a first surface of the fifth lens may be concave and a second surface thereof may be convex.

The fifth lens may have an aspherical surface. For example, both surfaces of the fifth lens may be aspherical. The fifth lens may be formed of a material having high light transmissivity and excellent workability. For example, the fifth lens may be formed of plastic. However, a material of the fifth lens is not limited to plastic. For example, the fifth lens may be formed of glass.

The fifth lens may be formed of a material having a high refractive index. For example, the fifth lens may be formed of a material having a refractive index of 1.60 or more (in this case, the fifth lens may have an Abbe number of 30 or less). The fifth lens formed of this material may easily refract light even when having a small curvature shape. Therefore, the fifth lens formed of this material may be easily manufactured and be advantageous in lowering a defect rate depending on a manufacturing tolerance. In addition, the fifth lens formed of this material may decrease a distance between lenses, and thus it may be advantageous in miniaturizing the lens module.

The sixth lens may have refractive power. For example, the sixth lens may have negative refractive power.

The sixth lens may have a meniscus shape of which an object-side surface is convex. As an example, a first surface of the sixth lens may be convex, and a second surface thereof may be concave.

The sixth lens may have an aspherical surface. For example, both surfaces of the sixth lens may be aspherical. In addition, the sixth lens may include an inflection point. For example, the first surface of the sixth lens may be convex at the center of an optical axis, be concave in the vicinity of the optical axis, and be convex at an edge thereof. Likewise, the second surface of the sixth lens may be concave at the center of an optical axis and become convex at an edge thereof. The sixth lens may be formed of a material having high light transmissivity and high workability. For example, the sixth lens may be formed of plastic. However, a material of the sixth lens is not limited to plastic. For example, the sixth lens may be formed of glass.

The image sensor may be configured to realize high resolution of 1300 megapixels. For example, a unit size of the pixels of the image sensor may be 1.12 μm or less.

The lens module may be configured to have a wide field of view. For example, the optical system of the lens module may have a field of view of 80° or more. In addition, the lens module may have a relatively short length (TTL). For example, an overall length (distance from the object-side surface of the first lens to the image plane) of the optical system of the lens module may be 4.30 mm or less. Therefore, the lens module may be advantageously miniaturized.

FIG. 1 is a view of a first example of a lens module.

A lens module 100 includes an optical system including a first lens 110, a second lens 120, a third lens 130, a fourth lens 140, a fifth lens 150, and a sixth lens 160. In addition, the lens module 100 further includes an infrared cut-off filter 70 and an image sensor 80. Further, the lens module 100 further includes a stop (ST). In this example, the stop is disposed between the first lens 110 and the second lens 120.

In this example, the first lens 110 has negative refractive power, and an object-side surface thereof is convex and an image-side surface thereof is concave. The second lens 120 has positive refractive power, and an object-side surface thereof is convex and an image-side surface thereof is convex. The third lens 130 has negative refractive power, and an object-side surface thereof is concave and an image-side surface thereof is concave. The fourth lens 140 has positive refractive power, and an object-side surface thereof is convex and an image-side surface thereof is convex. The fifth lens 150 has negative refractive power, and an object-side surface thereof is concave and an image-side surface thereof is convex. The sixth lens 160 has negative refractive power, and an object-side surface thereof is convex and an image-side surface thereof is concave. In addition, one or more inflection points are formed on each of the object-side surface and the image-side surface of the sixth lens.

In this example, all of the first lens 110, the third lens 130, the fifth lens 150, and the sixth lens 160 have negative refractive power as described above. Among these lenses, the fifth lens 150 has the strongest refractive power, and the sixth lens 160 has the weakest refractive power.

Figure 2:
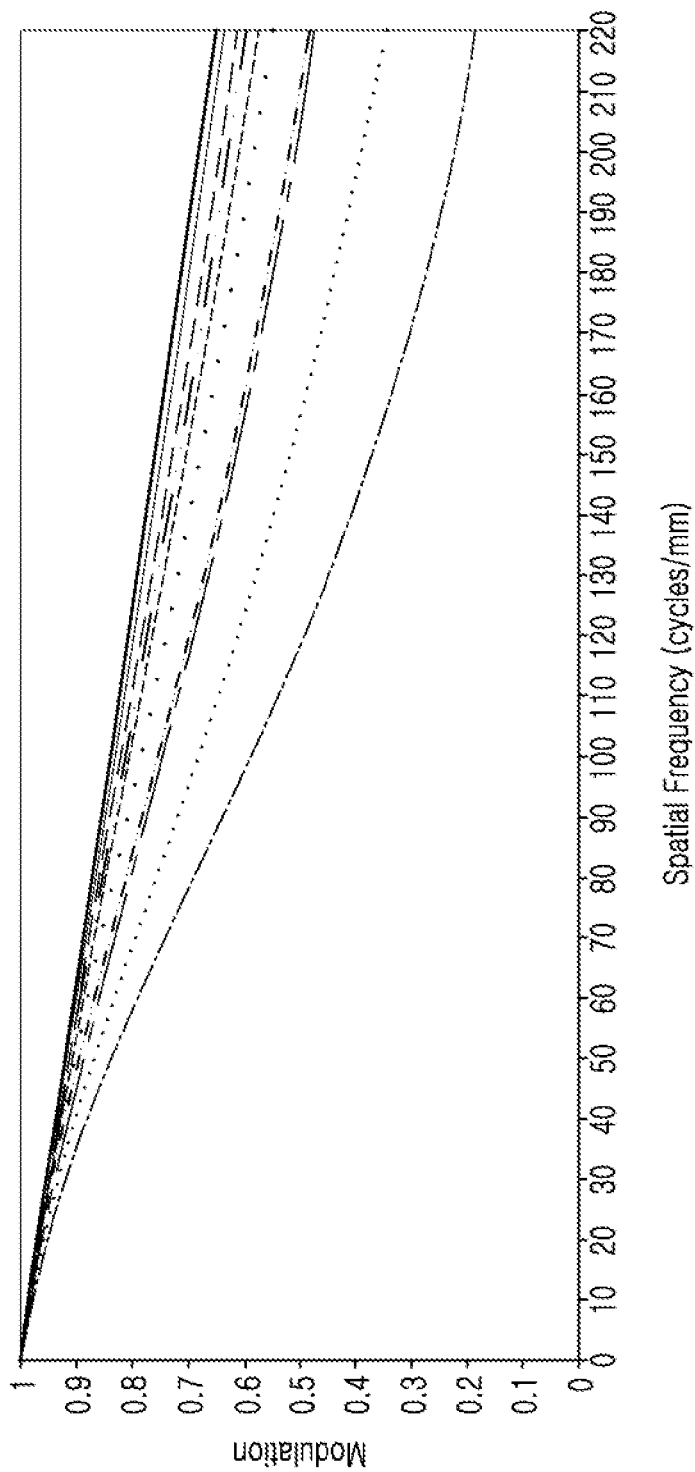
FIG. 2 is a graph including curves representing modulation transfer function (MTF) characteristics of the lens module illustrated in FIG. 1.

FIG. 2 is a graph including curves representing MTF characteristics of the lens module illustrated in FIG. 1.

Figure 3:
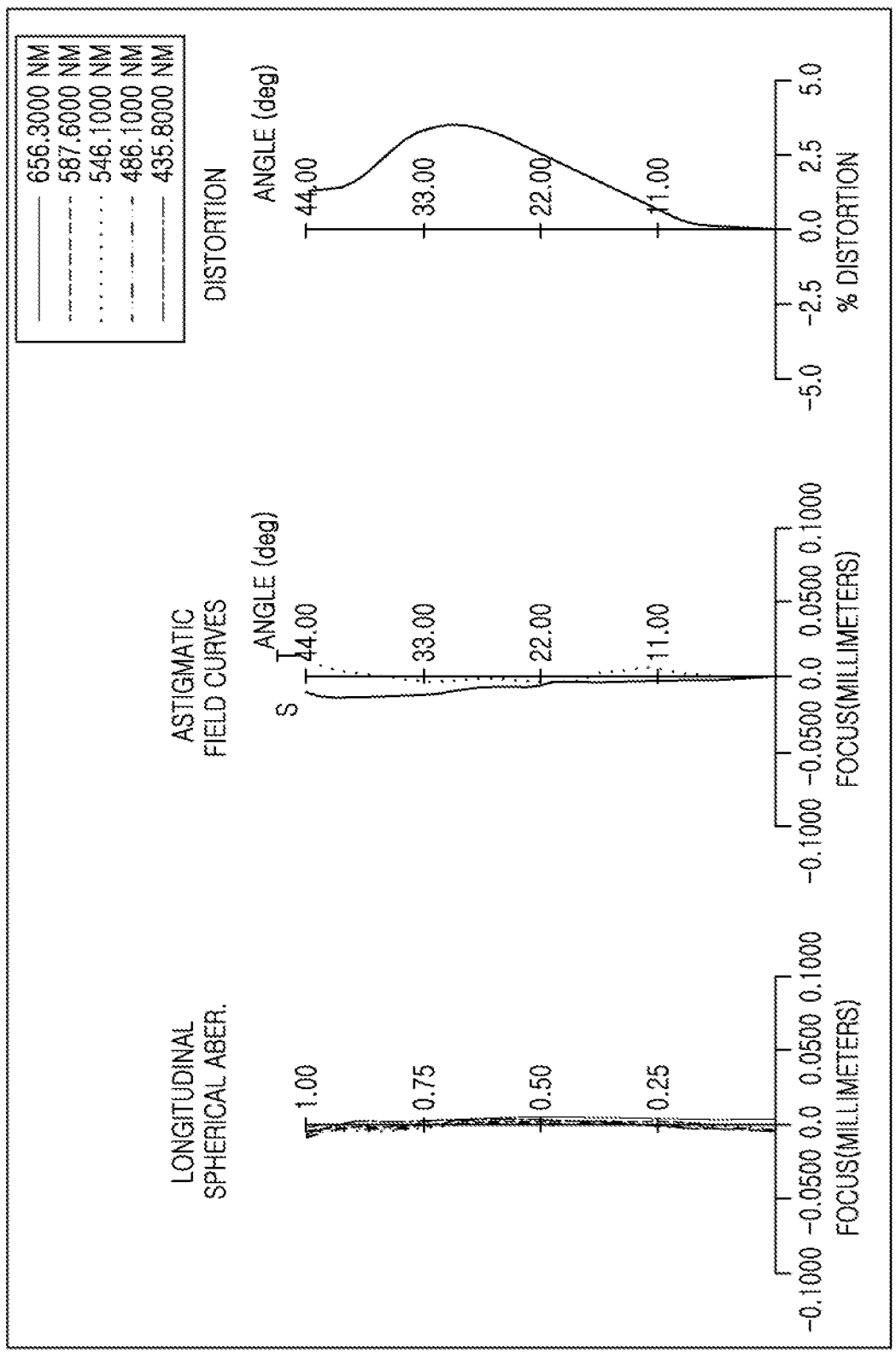
FIG. 3 is a graph including curves representing aberration characteristics of the lens module illustrated in FIG. 1.

FIG. 3 is a graph including curves representing aberration characteristics of the lens module illustrated in FIG. 1.

FIG. 4 is a table representing characteristics of the lenses of the lens module illustrated in FIG. 1. In FIG. 4, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 5 is a table representing aspherical surface coefficients of the lenses of the lens module illustrated in FIG. 1. In FIG. 5, the labels of the columns are Surface Nos. of the first to sixth lenses, and the labels of the rows are characteristics corresponding to each surface of the lenses.

Figure 6:
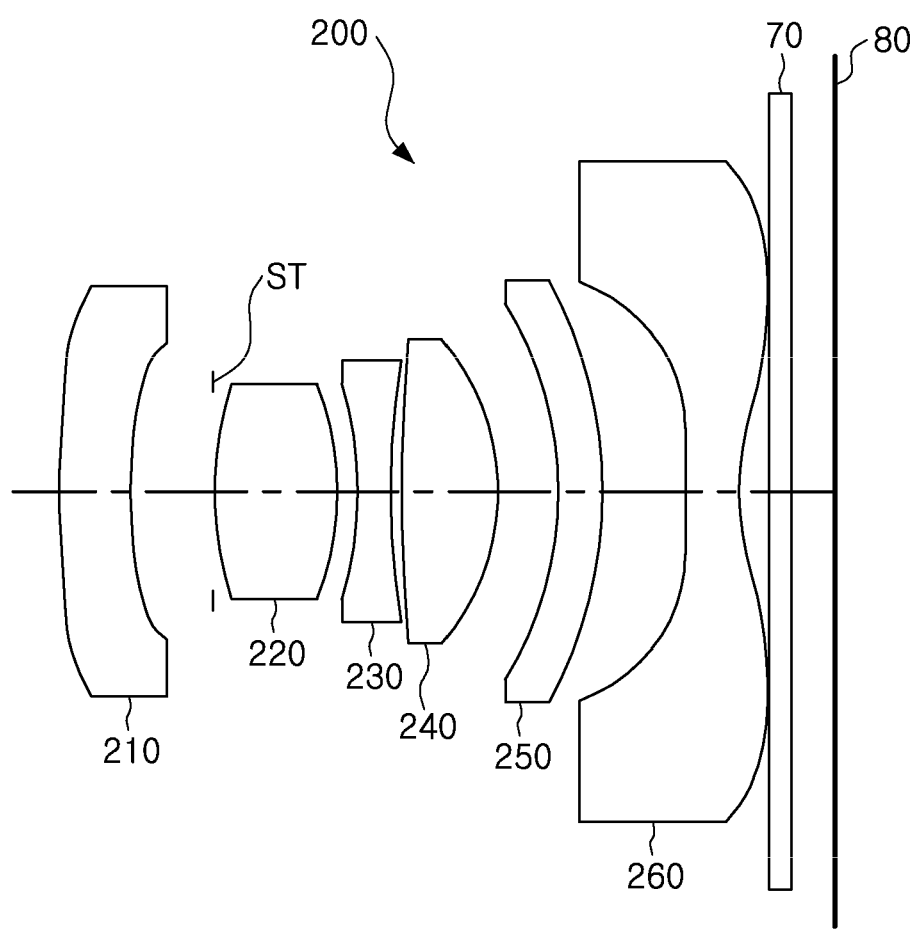
FIG. 6 is a view of a second example of a lens module.

FIG. 6 is a view of a second example of a lens module.

A lens module 200 includes an optical system including a first lens 210, a second lens 220, a third lens 230, a fourth lens 240, a fifth lens 250, and a sixth lens 260. In addition, the lens module 200 further includes an infrared cut-off filter 70 and an image sensor 80. Further, the lens module 200 further includes a stop (ST). In this example, the stop is disposed between the first lens 210 and the second lens 220.

In this example, the first lens 210 has negative refractive power, and an object-side surface thereof is convex and an image-side surface thereof is concave. The second lens 220 has positive refractive power, and an object-side surface thereof is convex and an image-side surface thereof is convex. The third lens 230 has negative refractive power, and an object-side surface thereof is concave and an image-side surface thereof is concave. The fourth lens 240 has positive refractive power, and an object-side surface thereof is convex and an image-side surface thereof is convex. The fifth lens 250 has negative refractive power, and an object-side surface thereof is concave and an image-side surface thereof is convex. The sixth lens 260 has negative refractive power, and an object-side surface thereof is convex and an image-side surface thereof is concave. In addition, one or more inflection points are formed on each of the object-side surface and the image-side surface of the sixth lens.

In this example, all of the first lens 210, the third lens 230, the fifth lens 250, and the sixth lens 260 has negative refractive power as described above. Among these lenses, the fifth lens 250 has the strongest refractive power, and the sixth lens 260 has the weakest refractive power.

Figure 7:
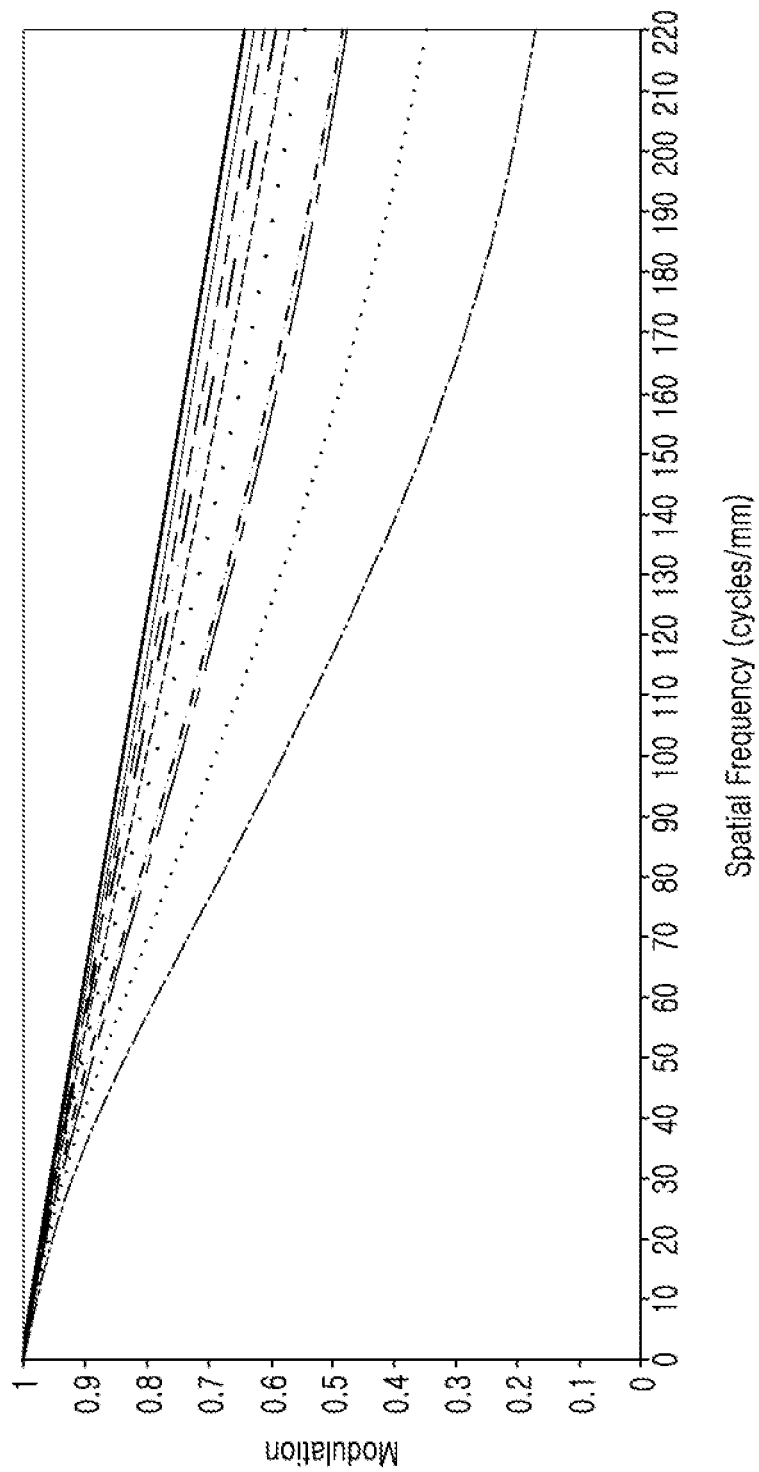
FIG. 7 is a graph including curves representing MTF characteristics of the lens module illustrated in FIG. 6.

FIG. 7 is a graph including curves representing MTF characteristics of the lens module illustrated in FIG. 6.

Figure 8:
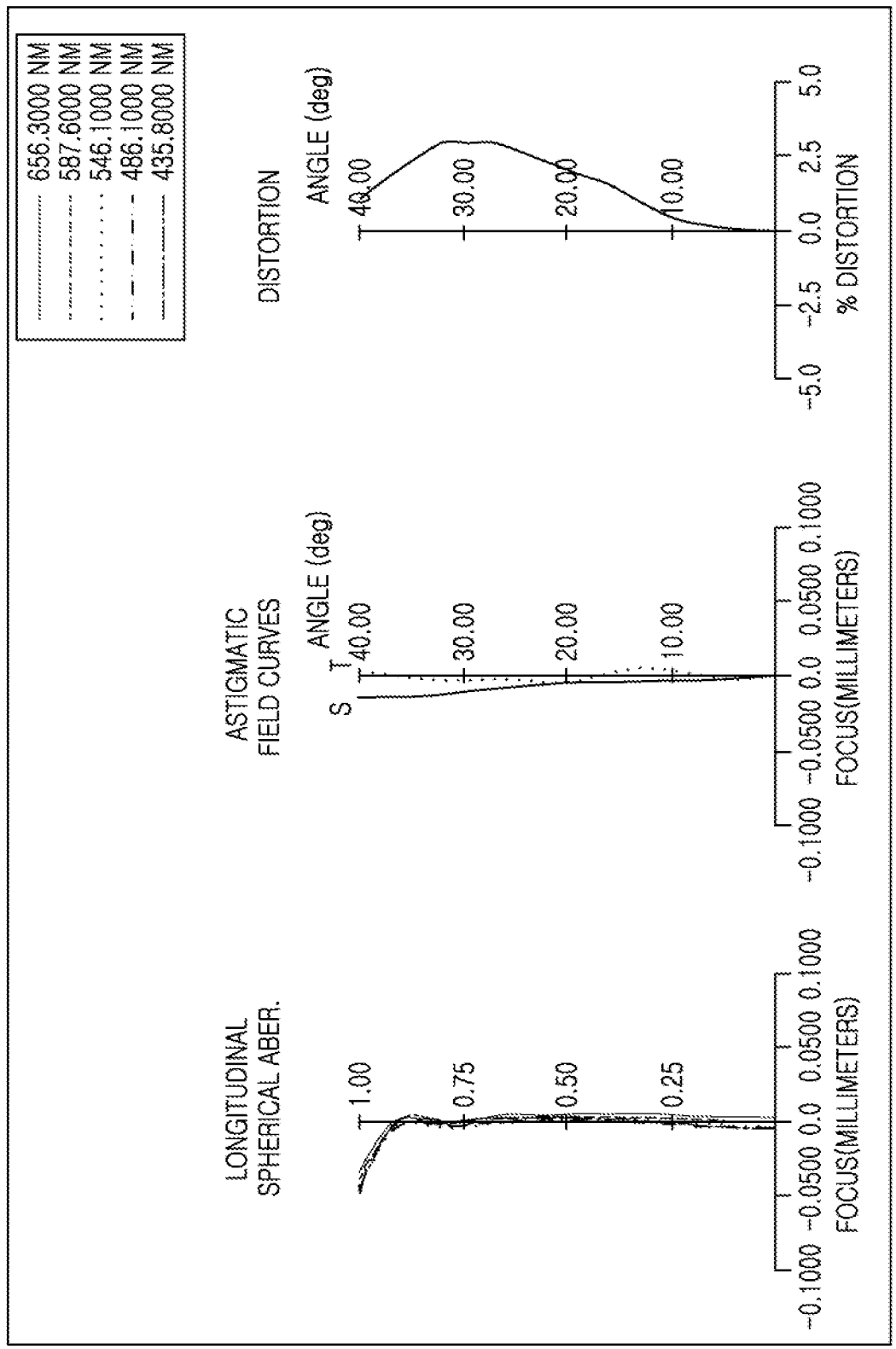
FIG. 8 is a graph including curves representing aberration characteristics of the lens module illustrated in FIG. 6.

FIG. 8 is a graph including curves representing aberration characteristics of the lens module illustrated in FIG. 6.

FIG. 9 is a table representing characteristics of the lenses of the lens module illustrated in FIG. 6. In FIG. 9, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 10 is a table representing aspherical surface coefficients of the lenses of the lens module illustrated in FIG. 6. In FIG. 10, the labels of the columns are Surface Nos. of the first to sixth lenses, and the labels of the rows are characteristics corresponding to each surface of the lenses.

Figure 11:
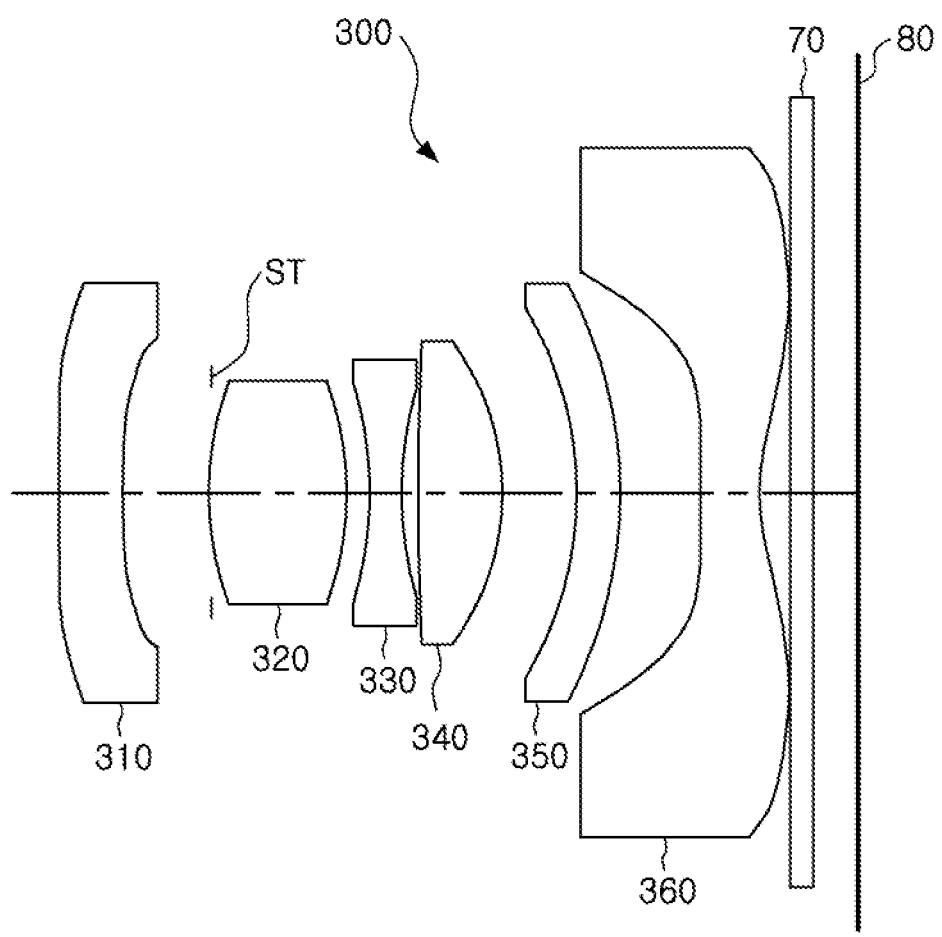
FIG. 11 is a view of a third example of a lens module.

FIG. 11 is a view of a third example of a lens module.

A lens module 300 includes an optical system including a first lens 310, a second lens 320, a third lens 330, a fourth lens 340, a fifth lens 350, and a sixth lens 360. In addition, the lens module 300 further includes an infrared cut-off filter 70 and an image sensor 80. Further, the lens module 300 further includes a stop (ST). In this example, the stop is disposed between the first lens 310 and the second lens 320.

In this example, the first lens 310 has negative refractive power, and an object-side surface thereof is convex and an image-side surface thereof is concave. The second lens 320 has positive refractive power, and an object-side surface thereof is convex and an image-side surface thereof is convex. The third lens 330 has negative refractive power, and an object-side surface thereof is concave and an image-side surface thereof is concave. The fourth lens 340 has positive refractive power, and an object-side surface thereof is convex and an image-side surface thereof is convex. The fifth lens 350 has negative refractive power, and an object-side surface thereof is concave and an image-side surface thereof is convex. The sixth lens 360 has negative refractive power, and an object-side surface thereof is convex and an image-side surface thereof is concave. In addition, one or more inflection points are formed on each of the object-side surface and the image-side surface of the sixth lens.

In this example, all of the first lens 310, the third lens 330, the fifth lens 350, and the sixth lens 360 has negative refractive power as described above. Among these lenses, the fifth lens 350 has the strongest refractive power, and the sixth lens 360 has the weakest refractive power.

Figure 12:
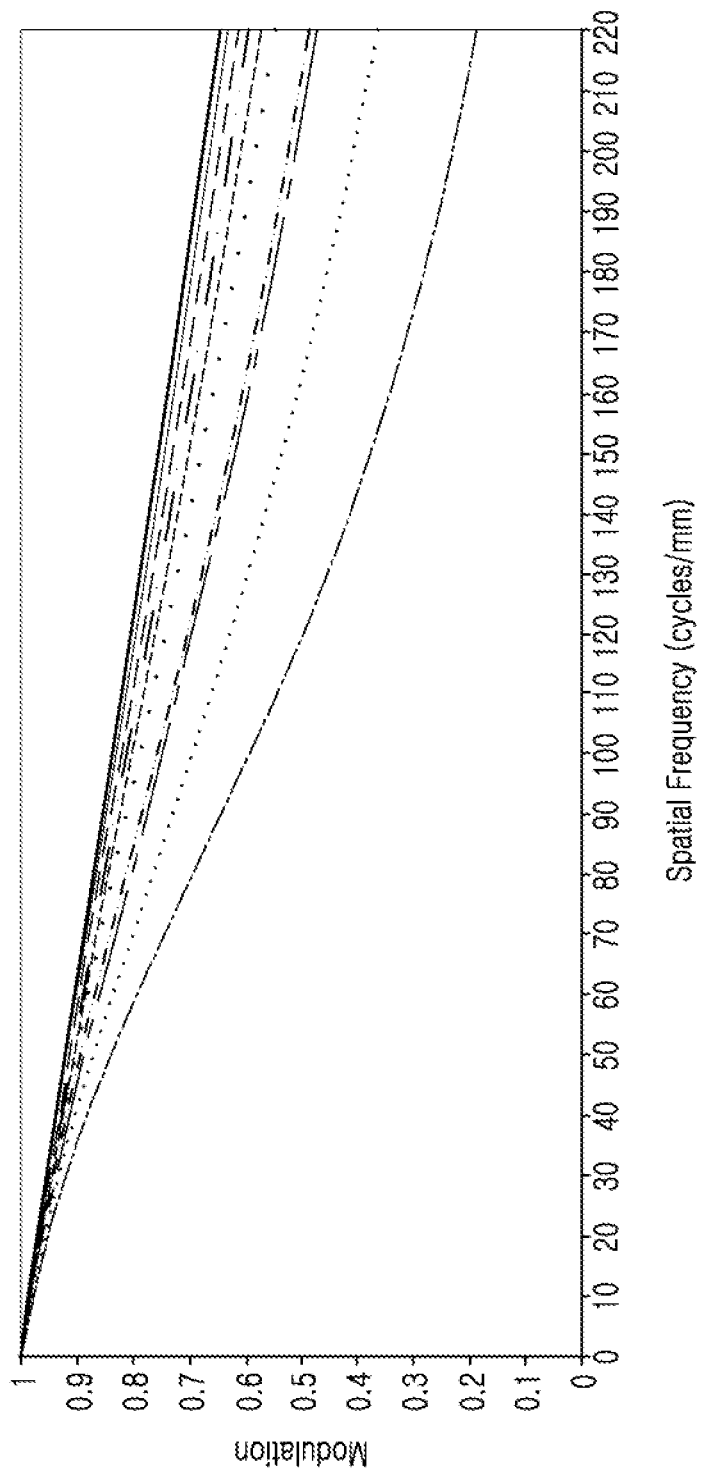
FIG. 12 is a graph including curves representing MTF characteristics of the lens module illustrated in FIG. 11.

FIG. 12 is a graph including curves representing MTF characteristics of the lens module illustrated in FIG. 11.

Figure 13:
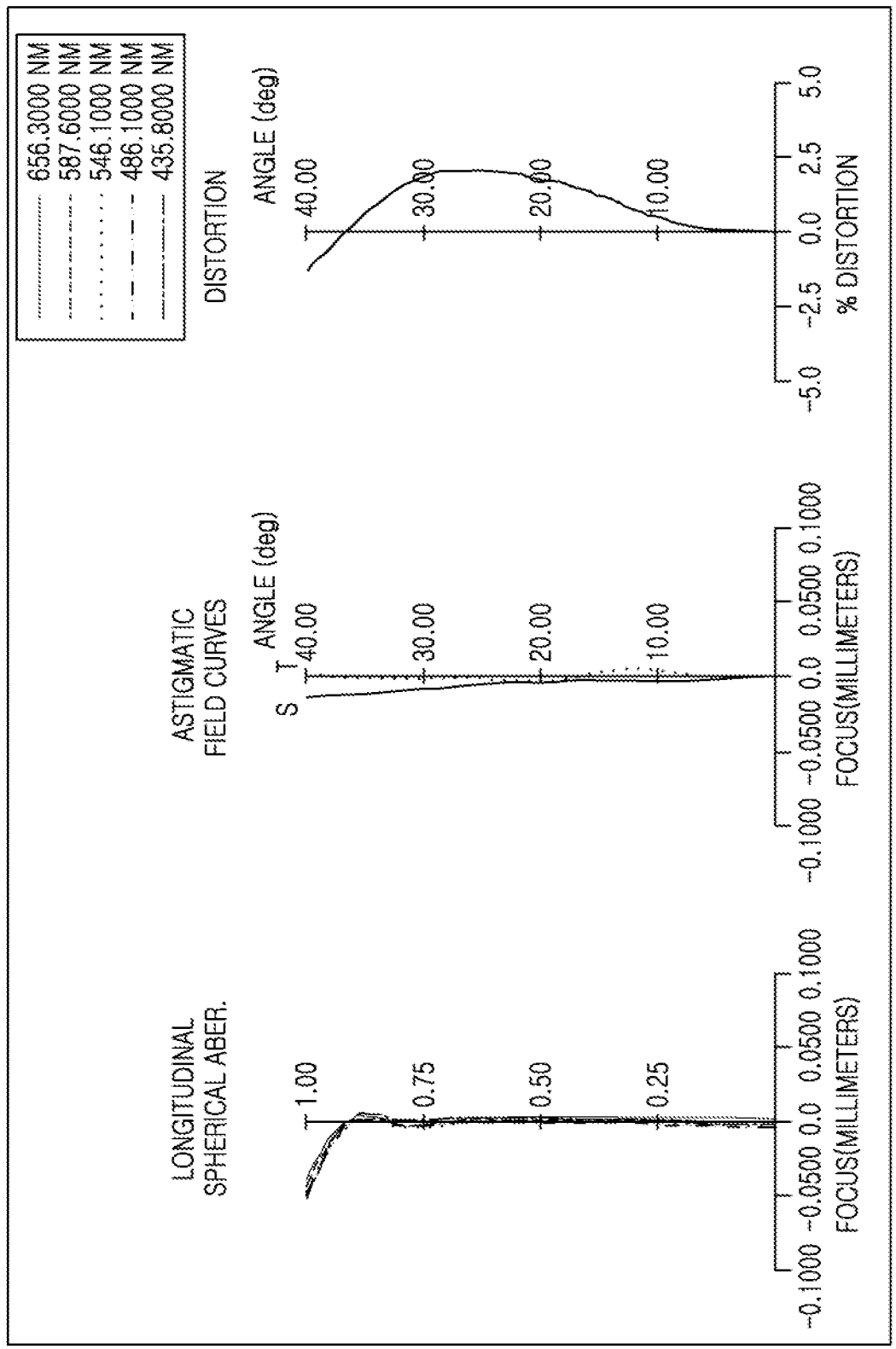
FIG. 13 is a graph including curves representing aberration characteristics of the lens module illustrated in FIG. 11.

FIG. 13 is a graph including curves representing aberration characteristics of the lens module illustrated in FIG. 11.

FIG. 14 is a table representing characteristics of the lenses of the lens module illustrated in FIG. 11. In FIG. 14, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 15 is a table representing aspherical surface coefficients of the lenses of the lens module illustrated in FIG. 11. In FIG. 15, the labels of the columns are Surface Nos. of the first to sixth lenses, and the labels of the rows are characteristics corresponding to each surface of the lenses.

Figure 16:
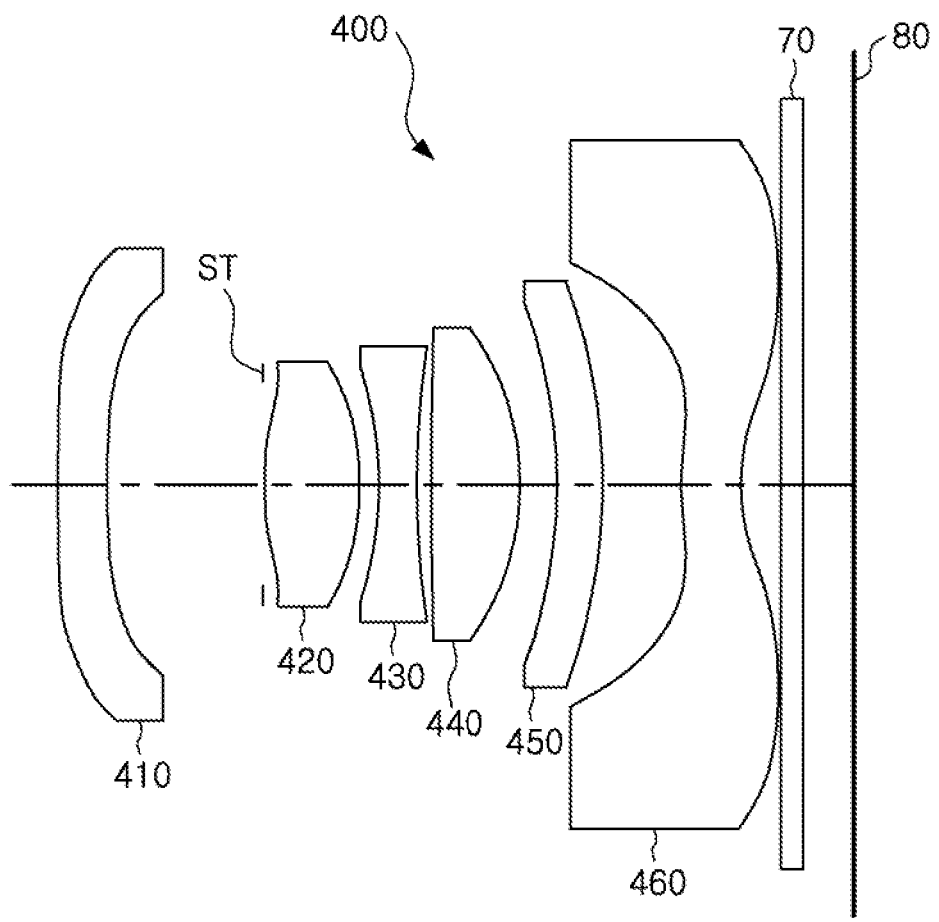
FIG. 16 is a view of a fourth example of a lens module.

FIG. 16 is a view of a fourth example of a lens module.

A lens module 400 includes an optical system including a first lens 410, a second lens 420, a third lens 430, a fourth lens 440, a fifth lens 450, and a sixth lens 460. In addition, the lens module 400 further includes an infrared cut-off filter 70 and an image sensor 80. Further, the lens module 400 further includes a stop (ST). In this example, the stop is disposed between the first lens 410 and the second lens 420.

In this example, the first lens 410 has negative refractive power, and an object-side surface thereof is convex and an image-side surface thereof is concave. The second lens 420 has positive refractive power, and an object-side surface thereof is convex and an image-side surface thereof is convex. The third lens 430 has negative refractive power, and an object-side surface thereof is concave and an image-side surface thereof is concave. The fourth lens 440 has positive refractive power, and an object-side surface thereof is convex and an image-side surface thereof is convex. The fifth lens 450 has negative refractive power, and an object-side surface thereof is concave and an image-side surface thereof is convex. The sixth lens 460 has negative refractive power, and an object-side surface thereof is convex and an image-side surface thereof is concave. In addition, one or more inflection points are formed on each of the object-side surface and the image-side surface of the sixth lens.

In this example, all of the first lens 410, the third lens 430, the fifth lens 450, and the sixth lens 460 has negative refractive power as described above. Among these lenses, the fifth lens 450 has the strongest refractive power, and the sixth lens 460 has the weakest refractive power.

Figure 17:
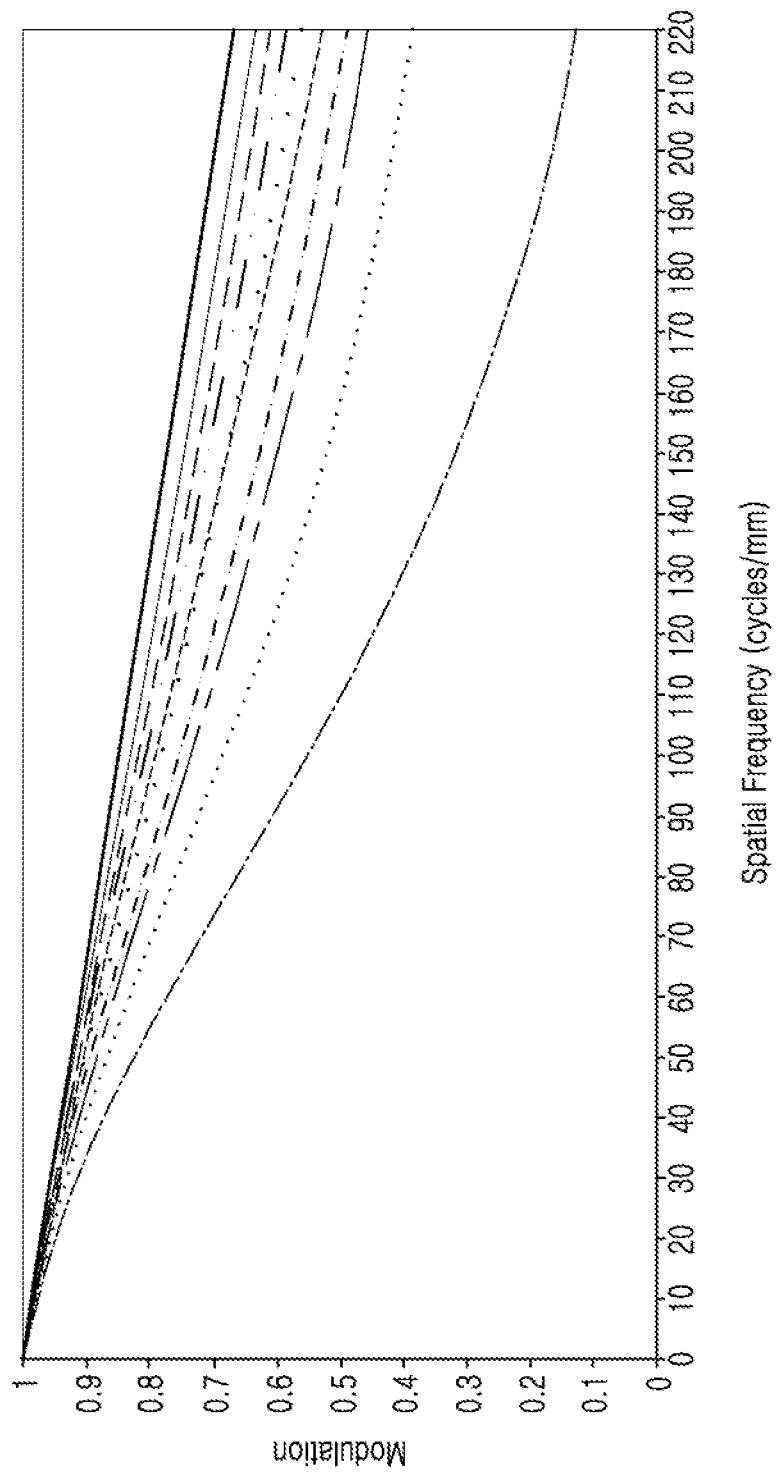
FIG. 17 is a graph including curves representing MTF characteristics of the lens module illustrated in FIG. 16.

FIG. 17 is a graph including curves representing MTF characteristics of the lens module illustrated in FIG. 16.

Figure 18:
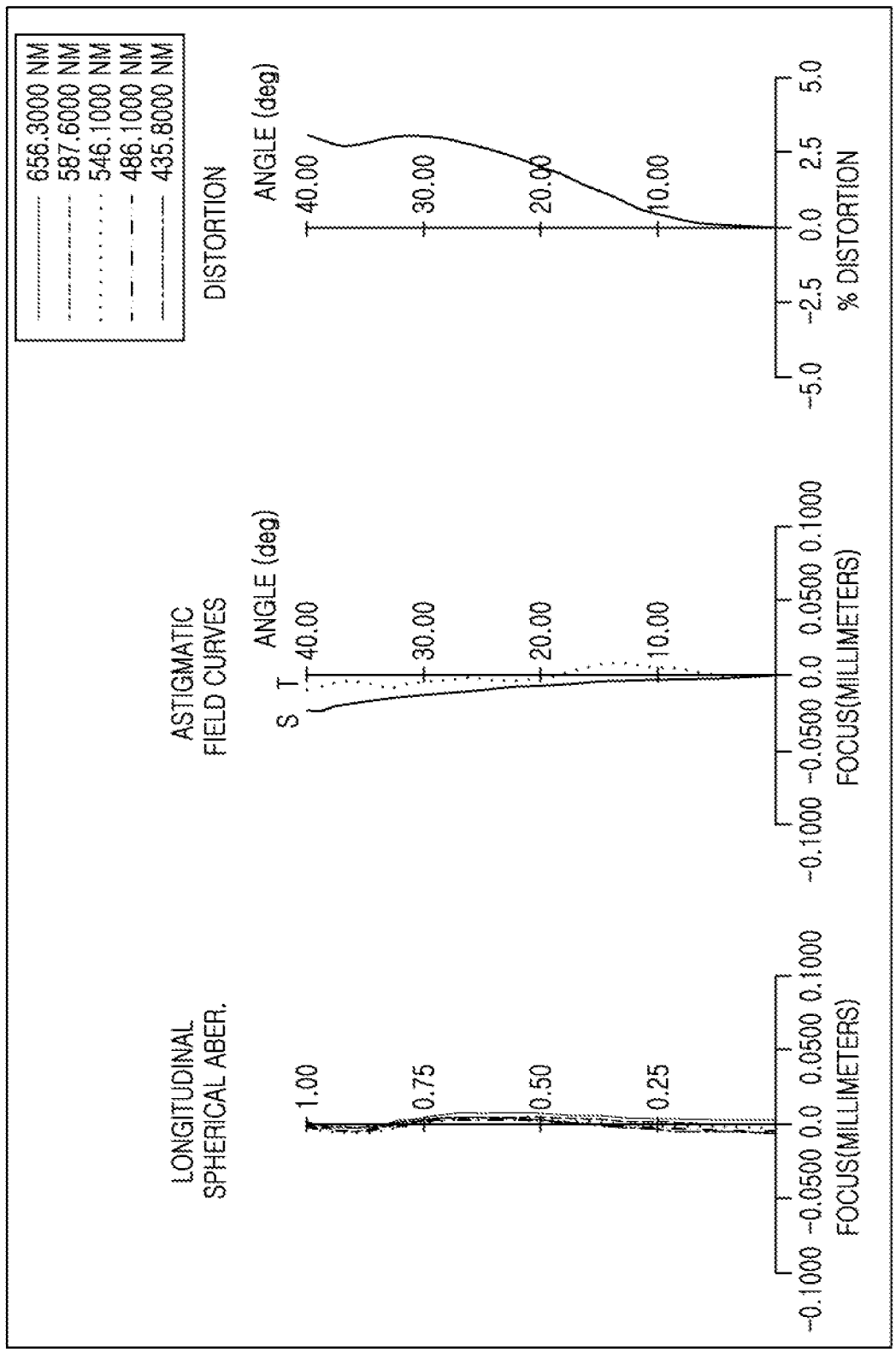
FIG. 18 is a graph including curves representing aberration characteristics of the lens module illustrated in FIG. 16.

FIG. 18 is a graph including curves representing aberration characteristics of the lens module illustrated in FIG. 16.

FIG. 19 is a table representing characteristics of the lenses of the lens module illustrated in FIG. 16. In FIG. 19, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 20 is a table representing aspherical surface coefficients of the lenses of the lens module illustrated in FIG. 16. In FIG. 20, the labels of the columns are Surface Nos. of the first to sixth lenses, and the labels of the rows are characteristics corresponding to each surface of the lenses.

Figure 21:
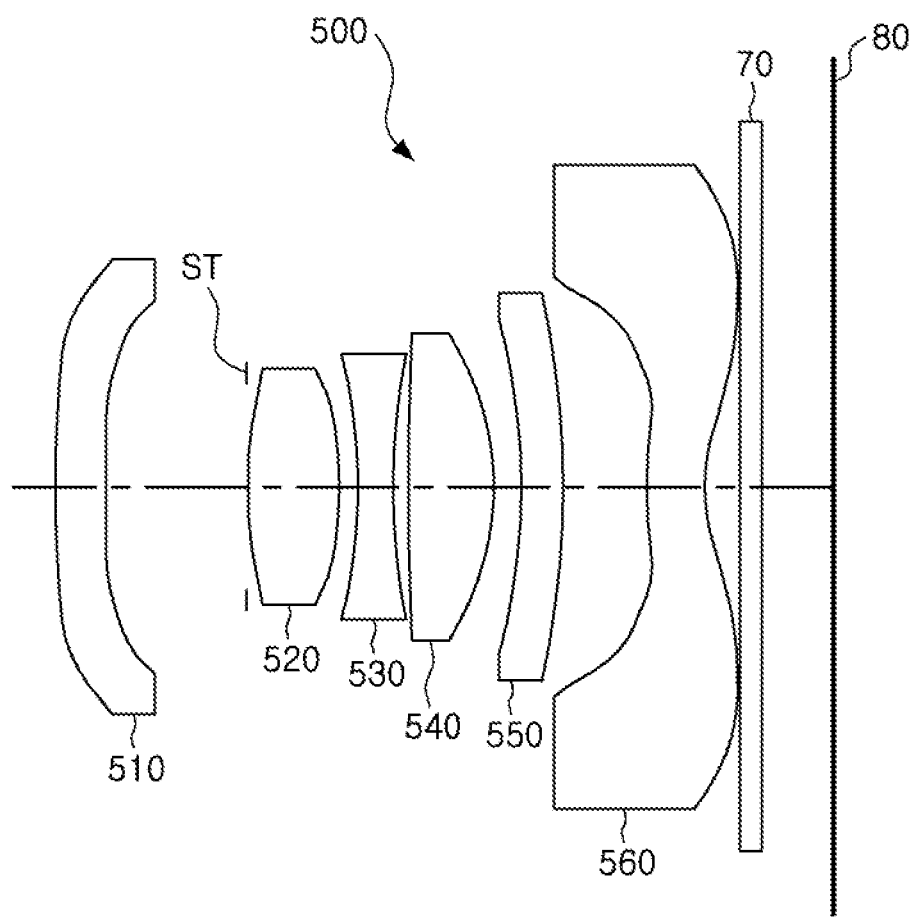
FIG. 21 is a view of a fifth example of a lens module.

FIG. 21 is a view of a fifth example of a lens module.

A lens module 500 includes an optical system including a first lens 510, a second lens 520, a third lens 530, a fourth lens 540, a fifth lens 550, and a sixth lens 560. In addition, the lens module 500 further includes an infrared cut-off filter 70 and an image sensor 80. Further, the lens module 500 further includes a stop (ST). In this example, the stop is disposed between the first lens 510 and the second lens 520.

In this example, the first lens 510 has negative refractive power, and an object-side surface thereof is convex and an image-side surface thereof is concave. The second lens 520 has positive refractive power, and an object-side surface thereof is convex and an image-side surface thereof is convex. The third lens 530 has negative refractive power, and an object-side surface thereof is concave and an image-side surface thereof is concave. The fourth lens 540 has positive refractive power, and an object-side surface thereof is convex and an image-side surface thereof is convex. The fifth lens 550 has negative refractive power, and an object-side surface thereof is concave and an image-side surface thereof is convex. The sixth lens 560 has negative refractive power, and an object-side surface thereof is convex and an image-side surface thereof is concave. In addition, one or more inflection points are formed on each of the object-side surface and the image-side surface of the sixth lens.

In this example, all of the first lens 510, the third lens 530, the fifth lens 550, and the sixth lens 560 has negative refractive power as described above. Among these lenses, the fifth lens 550 has the strongest refractive power, and the sixth lens 560 has the weakest refractive power.

Figure 22:
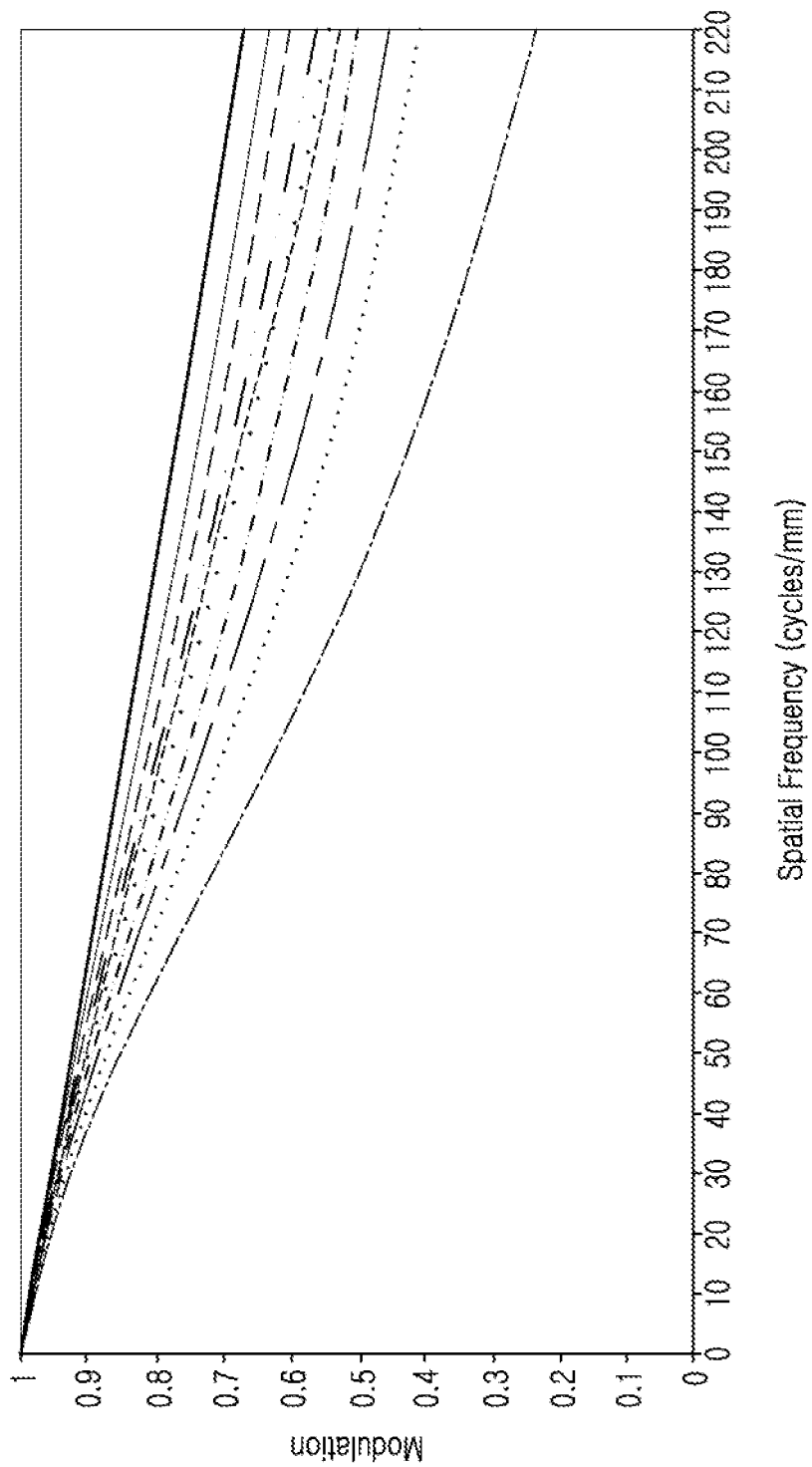
FIG. 22 is a graph including curves representing MTF characteristics of the lens module illustrated in FIG. 21.

FIG. 22 is a graph including curves representing MTF characteristics of the lens module illustrated in FIG. 21.

Figure 23:
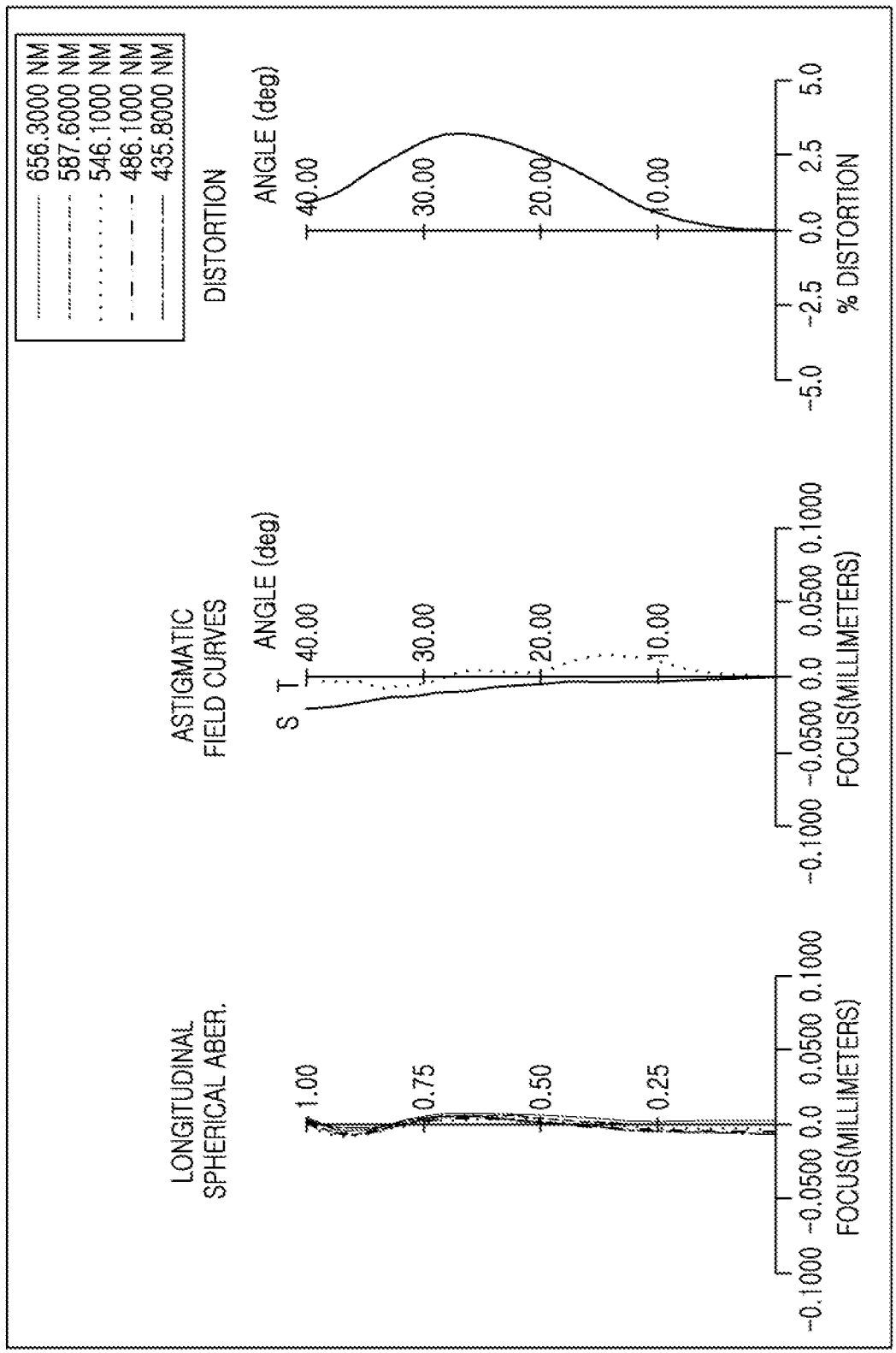
FIG. 23 is a graph including curves representing aberration characteristics of the lens module illustrated in FIG. 21.

FIG. 23 is a graph including curves representing aberration characteristics of the lens module illustrated in FIG. 21.

FIG. 24 is a table representing characteristics of the lenses of the lens module illustrated in FIG. 21. In FIG. 24, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 25 is a table representing aspherical surface coefficients of the lenses of the lens module illustrated in FIG. 21. In FIG. 25, the labels of the columns are Surface Nos. of the first to sixth lenses, and the labels of the rows are characteristics corresponding to each surface of the lenses.

Figure 26:
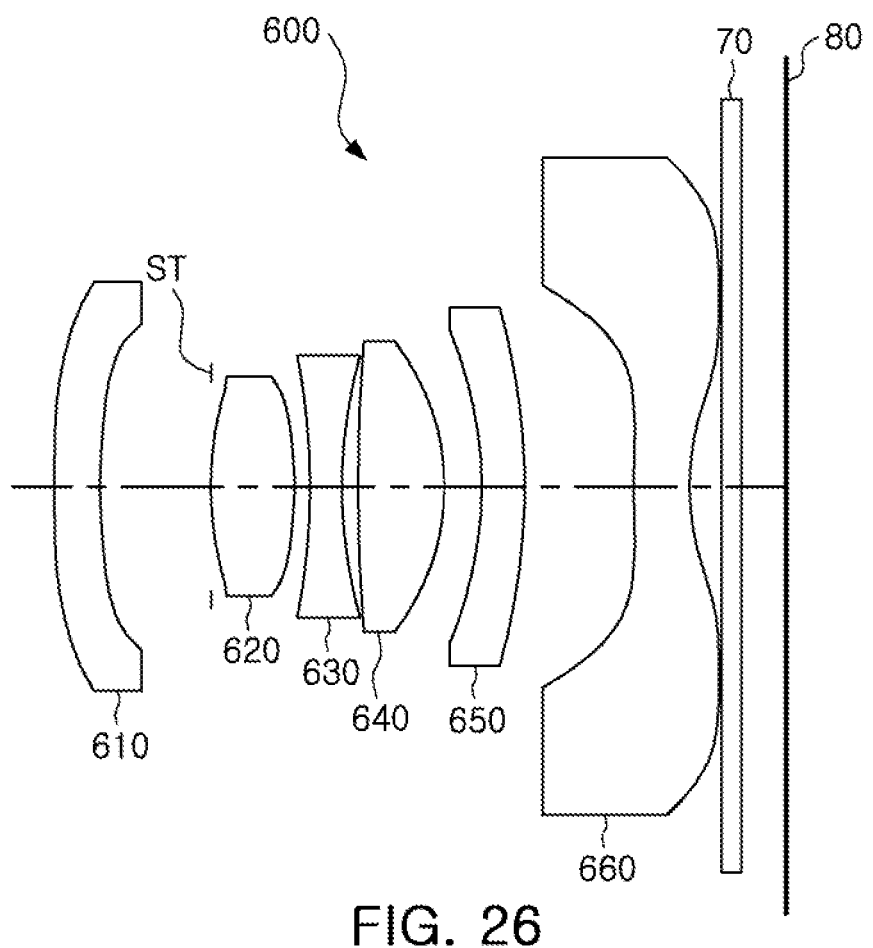
FIG. 26 is a view of a sixth example of a lens module.

FIG. 26 is a view of a sixth example of a lens module.

A lens module 600 includes an optical system including a first lens 610, a second lens 620, a third lens 630, a fourth lens 640, a fifth lens 650, and a sixth lens 660. In addition, the lens module 600 further includes an infrared cut-off filter 70 and an image sensor 80. Further, the lens module 600 further includes a stop (ST). In this example, the stop is disposed between the first lens 610 and the second lens 620.

In this example, the first lens 610 has negative refractive power, and an object-side surface thereof is convex and an image-side surface thereof is concave. The second lens 620 has positive refractive power, and an object-side surface thereof is convex and an image-side surface thereof is convex. The third lens 630 has negative refractive power, and an object-side surface thereof is concave and an image-side surface thereof is concave. The fourth lens 640 has positive refractive power, and an object-side surface thereof is convex and an image-side surface thereof is convex. The fifth lens 650 has negative refractive power, and an object-side surface thereof is concave and an image-side surface thereof is convex. The sixth lens 660 has negative refractive power, and an object-side surface thereof is convex and an image-side surface thereof is concave. In addition, one or more inflection points are formed on each of the object-side surface and the image-side surface of the sixth lens.

In this example, all of the first lens 610, the third lens 630, the fifth lens 650, and the sixth lens 660 has negative refractive power as described above. Among these lenses, the first lens 610 has the strongest refractive power, and the sixth lens 660 has the weakest refractive power.

Figure 27:
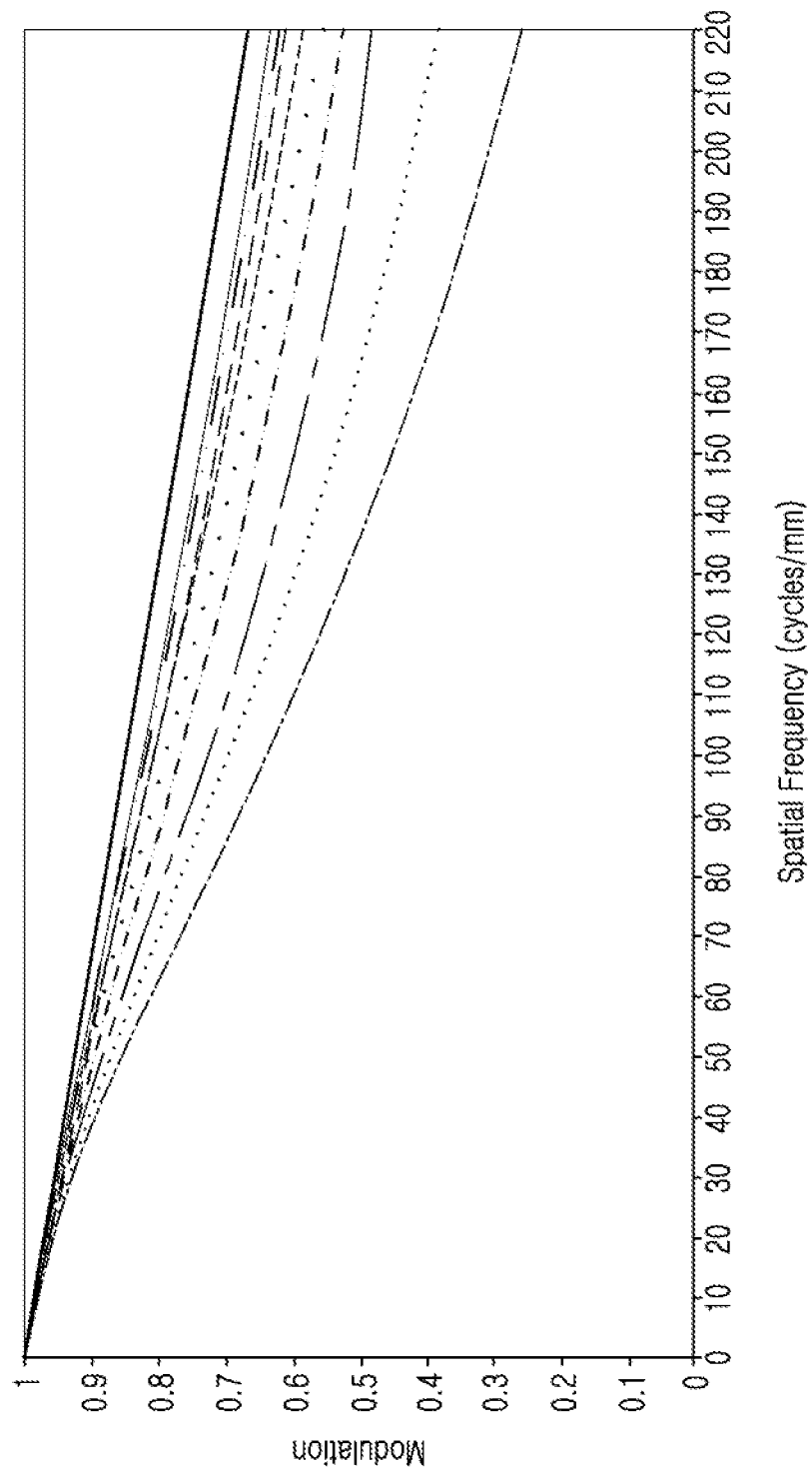
FIG. 27 is a graph including curves representing MTF characteristics of the lens module illustrated in FIG. 26.

FIG. 27 is a graph including curves representing MTF characteristics of the lens module illustrated in FIG. 26.

Figure 28:
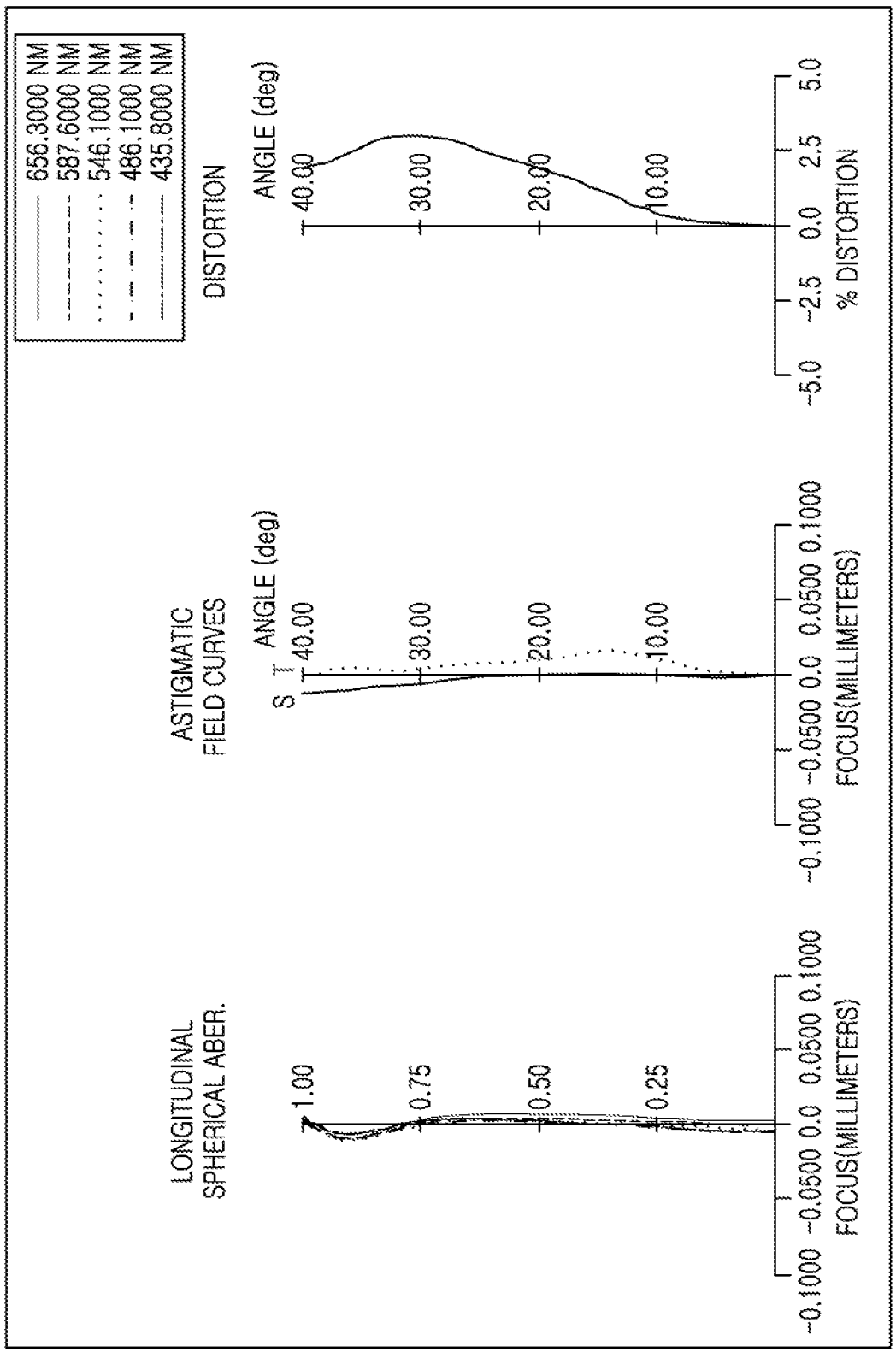
FIG. 28 is a graph including curves representing aberration characteristics of the lens module illustrated in FIG. 26.

FIG. 28 is a graph including curves representing aberration characteristics of the lens module illustrated in FIG. 26.

FIG. 29 is a table representing characteristics of the lenses of the lens module illustrated in FIG. 26. In FIG. 29, Surface Nos. 1 and 2 indicate the first surface (object-side surface) and the second surface (image-side surface) of the first lens, and Surface Nos. 3 and 4 indicate the first and second surfaces of the second lens. Similarly, Surface Nos. 5 to 12 indicate first and second surfaces of the third to sixth lenses, respectively. In addition, Surface Nos. 13 and 14 indicate first and second surfaces of the infrared cut-off filter.

FIG. 30 is a table representing aspherical surface coefficients of the lenses of the lens module illustrated in FIG. 26. In FIG. 30, the labels of the columns are Surface Nos. of the first to sixth lenses, and the labels of the rows are characteristics corresponding to each surface of the lenses.

The following Table 1 lists optical characteristics of the lens modules of the first to sixth examples. The lens module has an overall focal length (f) of 4.00 to 4.40. A focal length (f1) of the first lens is determined in a range of −50.0 to −10.0. A focal length (f2) of the second lens is determined in a range of 1.70 to 2.50. A focal length (f3) of the third lens is determined in a range of −3.60 to −2.70. A focal length (f4) of the fourth lens is determined in a range of 2.0 to 2.40. A focal length (f5) of the fifth lens is determined in a range of −1000 to −17.0. A focal length (f6) of the sixth lens is determined in a range of −3.0 to −2.0. A composite focal length (f12) of the first and second lenses (not listed in Table 1) is determined in a range of 3.9 to 5.9. An overall length (TTL) of the optical system is determined in a range of 4.0 to 4.40. A BFL is determined in a range of 0.50 to 0.70. A field of view (FOV) is in a range of 75.0 to 95.0.

TABLE 1

| Remarks | First Example | Second Example | Third Example | Fourth Example | Fifth Example | Sixth Example |
|---|---|---|---|---|---|---|
| f | 2.3820 | 2.4590 | 2.4460 | 2.2690 | 2.3450 | 2.4130 |
| f1 | −11.905 | −11.580 | −11.106 | −42.437 | −48.183 | −23.743 |
| f2 | 1.9631 | 1.9936 | 1.8745 | 2.0944 | 2.1773 | 2.3347 |
| f3 | −3.1284 | −3.1778 | −2.8064 | −2.9947 | −3.0357 | −3.4662 |
| f4 | 2.1754 | 2.2357 | 2.2873 | 2.1434 | 2.2286 | 2.1017 |
| f5 | −22.185 | −29.148 | −943.304 | −995.308 | −978.509 | −18.785 |
| f6 | −2.3790 | −2.2964 | −2.1039 | −2.3215 | −2.5612 | −2.4301 |
| TTL | 4.3000 | 4.3010 | 4.2340 | 4.1840 | 4.1500 | 4.1000 |
| BFL | 0.5520 | 0.5330 | 0.5180 | 0.5970 | 0.6810 | 0.5390 |
| FOV | 88.0 | 80.0 | 80.0 | 80.0 | 80.0 | 80.0 |

The following Table 2 lists values of Conditional Expressions of the lens modules of the first to sixth examples.

TABLE 2

| Conditional Expressions | First Example | Second Example | Third Example | Fourth Example | Fifth Example | Sixth Example |
|---|---|---|---|---|---|---|
| f1/f | −4.9980 | −4.7091 | −4.5405 | −18.7031 | −20.5473 | −9.8396 |
| f5/f | −9.3137 | −11.8536 | −385.6516 | −438.6551 | −417.2745 | −7.7851 |
| TTL/BFL | 7.7899 | 8.0694 | 8.1737 | 7.0084 | 6.0940 | 7.6067 |
| (r9 + r10)/(r9 − r10) | −10.3181 | −12.1154 | −43.1154 | −57.0714 | −72.1111 | −6.5571 |
| r1/T12 | 7198.76 | 82.320 | 43531.7 | 3868.23 | 359.86 | 78.486 |
| T45/T56 | 0.8813 | 0.8482 | 0.8588 | 0.4371 | 0.2844 | 0.3462 |
| (1/f1 + 1/f2)/(1/f4 + 1/f5) | 1.0260 | 1.0055 | 1.0167 | 0.9750 | 0.9795 | 0.9140 |

As seen in Table 2, the lens modules of the first to sixth examples satisfy all of the Conditional Expressions.

The examples described above enable an optical system to have high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a first lens having a convex object-side surface in an optical axis portion thereof;
   a second lens having a convex object-side surface in an optical axis portion thereof and a convex image-side surface in an optical axis portion thereof;
   a third lens having a concave object-side surface in an optical axis portion thereof and a concave image-side surface in an optical axis portion thereof;
   a fourth lens having a positive refractive power, a convex object-side surface in an optical axis portion thereof, a convex image-side surface in an optical axis portion thereof, and a focal length in a range of 2.0 mm to 2.40 mm;
   a fifth lens having a concave object-side surface in an optical axis portion thereof; and
   a sixth lens having a convex object-side surface in an optical axis portion thereof and an image-side-surface having one or more inflection points thereon,
   wherein the first to sixth lenses are sequentially disposed in ascending numerical order along an optical axis of the lens module from an object side of the lens module toward an image plane of the lens module, and
   (r9+r10)/(r9−r10)<−6.0 is satisfied, where r9 is a radius of curvature of the object-side surface of the fifth lens on the optical axis, and r10 is a radius of curvature of an image-side surface of the fifth lens on the optical axis.

2. The lens module of claim 1, wherein the first lens has a concave image-side surface in an optical axis portion thereof.

3. The lens module of claim 1, wherein the image-side surface of the fifth lens is convex in an optical axis portion thereof.

4. The lens module of claim 1, wherein the image-side surface of the sixth lens is concave in an optical axis portion thereof.

5. The lens module of claim 1, wherein f1/f<−4.0 is satisfied, where f is an overall focal length of an optical system comprising the first to sixth lenses, and f1 is a focal length of the first lens.

6. The lens module of claim 1, wherein f5/f<−7.0 is satisfied, where f is an overall focal length of an optical system comprising the first to sixth lenses, and f5 is a focal length of the fifth lens.

7. The lens module of claim 1, wherein 6.0<TTL/BFL is satisfied, where TTL is a distance along the optical axis from the object-side surface of the first lens to the image plane, and BFL is a distance along the optical axis from the image-side surface of the sixth lens to the image plane.

8. The lens module of claim 1, wherein 70<r1/T12 is satisfied, where r1 is a radius of curvature of the object-side surface of the first lens on the optical axis, and T12 is a distance along the optical axis from an image-side surface of the first lens to the object-side surface of the second lens.

9. The lens module of claim 1, wherein 0.2<T45/T56 is satisfied, where T45 is a distance along the optical axis from the image-side surface of the fourth lens to the object-side surface of the fifth lens, and T56 is a distance along the optical axis from the image-side surface of the fifth lens to the object-side surface of the sixth lens.

10. A lens module comprising:
a first lens having a negative refractive power;
a second lens having a positive refractive power;
a third lens having a refractive power;
a fourth lens having a positive refractive power and a focal length in a range of 2.0 mm to 2.40 mm;
a fifth lens having a negative refractive power; and
a sixth lens having a negative refractive power and an image-side surface having one or more inflection points,
wherein the first to sixth lenses are sequentially disposed in ascending numerical order along an optical axis of the lens module from an object side of the lens module toward an image plane of the lens module, and
(r9+r10)/(r9−r10)<−6.0 is satisfied, where r9 is a radius of curvature of an object-side surface of the fifth lens on the optical axis, and r10 is a radius of curvature of an image-side surface of the fifth lens on the optical axis.

11. A lens module comprising:
a first lens having a negative refractive power;
a second lens having a positive refractive power;
a third lens having a negative refractive power;
a fourth lens having a positive refractive power and a focal length in a range of 2.0 mm to 2.40 mm;
a fifth lens having a negative refractive power; and
a sixth lens having a refractive power and an image-side surface having one or more inflection points,
wherein the first to sixth lenses are sequentially disposed in ascending numerical order along an optical axis of the lens module from an object side of the lens module toward an image plane of the lens module, and
(r9+r10)/(r9−r10)<−6.0 is satisfied, where r9 is a radius of curvature of an object-side surface of the fifth lens on the optical axis, and r10 is a radius of curvature of an image-side surface of the fifth lens on the optical axis.

12. The lens module of claim 11, wherein the sixth lens has a negative refractive power.

13. A lens module comprising:
a first lens, a second lens, a third lens, a fourth lens, a fifth lens, and a sixth lens each having a respective refractive power sequentially disposed in ascending numerical order along an optical axis of the lens module from an object side of the lens module toward an image plane of the lens module,
wherein the third lens has a concave object-side surface in an optical axis portion thereof and a concave image-side surface in an optical axis portion thereof,
a sign of the refractive power of the first lens is the same as a sign of the refractive power of the fifth lens,
a sign of the refractive power of the second lens is the same as a sign of the refractive power of the fourth lens,
the fourth lens has a focal length in a range of 2.0 mm to 2.40 mm, and
(r9+r10)/(r9−r10)<−6.0 is satisfied, where r9 is a radius of curvature of an object-side surface of the fifth lens on the optical axis, and r10 is a radius of curvature of an image-side surface of the fifth lens on the optical axis.

14. The lens module of claim 13, wherein a sign of a radius of curvature of an object-side surface of the first lens on the optical axis is opposite to a sign of a radius of curvature of an image-side surface of the fifth lens on the optical axis,
a sign of a radius of curvature of an image-side surface of the first lens on the optical axis is opposite to a sign of a radius of curvature of an object-side surface of the fifth lens on the optical axis,
a sign of a radius of curvature of an object-side surface of the second lens on the optical axis is opposite to a sign of a radius of curvature of an image-side surface of the fourth lens on the optical axis, and
a sign of a radius of curvature of an image-side surface of the second lens on the optical axis is opposite to a sign of a radius of curvature of an object-side surface of the fourth lens on the optical axis.

15. The lens module of claim 13, wherein the first lens has a convex object-side surface in an optical axis portion thereof and a concave image-side surface in an optical axis portion thereof.

16. The lens module of claim 13, wherein the second lens has a convex object-side surface in an optical axis portion thereof and a convex image-side surface in an optical axis portion thereof.

17. The lens module of claim 13, wherein 0.6<(1/f1+1/f2)/(1/f4+1/f5)<1.6 is satisfied, where f1 is a focal length of the first lens, f2 is a focal length of the second lens, f4 is a focal length of the fourth lens, and f5 is a focal length of the fifth lens.

* * * * *